US011822012B2

United States Patent
Hall et al.

(10) Patent No.: US 11,822,012 B2
(45) Date of Patent: Nov. 21, 2023

(54) MULTIPLE PULSE, LIDAR BASED 3-D IMAGING

(71) Applicant: VELODYNE LIDAR USA, INC., San Jose, CA (US)

(72) Inventors: David S. Hall, San Jose, CA (US); Pieter J. Kerstens, Gilroy, CA (US)

(73) Assignee: Velodyne Lidar USA, Inc., San Jose, CA (US)

( * ) Notice: Subject to any disclaimer, the term of this patent is extended or adjusted under 35 U.S.C. 154(b) by 0 days.

(21) Appl. No.: 16/909,846

(22) Filed: Jun. 23, 2020

(65) Prior Publication Data

US 2020/0319312 A1 Oct. 8, 2020

Related U.S. Application Data

(63) Continuation of application No. 16/854,755, filed on Apr. 21, 2020, now Pat. No. 11,137,480, which is a
(Continued)

(51) Int. Cl.
*G01S 7/481* (2006.01)
*G01S 17/06* (2006.01)
(Continued)

(52) U.S. Cl.
CPC ............ *G01S 7/4815* (2013.01); *G01S 7/484* (2013.01); *G01S 17/06* (2013.01); *G01S 17/10* (2013.01); *G01S 17/42* (2013.01); *G01S 17/89* (2013.01)

(58) Field of Classification Search
CPC ........ G01S 7/4815; G01S 17/10; G01S 7/484; G01S 17/42; G01S 17/89; G01S 17/06
(Continued)

(56) References Cited

U.S. PATENT DOCUMENTS 3,064,252 A 11/1962 Varela
3,373,441 A 3/1968 Zadig
(Continued)

FOREIGN PATENT DOCUMENTS

CA 2089105 A1 8/1994
CH 641583 A5 2/1984
(Continued)

OTHER PUBLICATIONS

U.S. Appl. No. 15/941,302, filed Mar. 30, 2018.
(Continued)

*Primary Examiner* — Daniel L Murphy
(74) *Attorney, Agent, or Firm* — Kilpatrick Townsend & Stockton LLP

(57) ABSTRACT

Methods and systems for performing multiple pulse LIDAR measurements are presented herein. In one aspect, each LIDAR measurement beam illuminates a location in a three dimensional environment with a sequence of multiple pulses of illumination light. Light reflected from the location is detected by a photosensitive detector of the LIDAR system during a measurement window having a duration that is greater than or equal to the time of flight of light from the LIDAR system out to the programmed range of the LIDAR system, and back. The pulses in a measurement pulse sequence can vary in magnitude and duration. Furthermore, the delay between pulses and the number of pulses in each measurement pulse sequence can also be varied. In some embodiments, the multi-pulse illumination beam is encoded and the return measurement pulse sequence is decoded to distinguish the measurement pulse sequence from exogenous signals.

24 Claims, 12 Drawing Sheets

Related U.S. Application Data continuation of application No. 15/339,790, filed on Oct. 31, 2016, now Pat. No. 10,627,490.

(60) Provisional application No. 62/289,277, filed on Jan. 31, 2016.

(51) Int. Cl.
| | |
|---|---|
| *G01S 17/10* | (2020.01) |
| *G01S 17/89* | (2020.01) |
| *G01S 17/42* | (2006.01) |
| *G01S 7/484* | (2006.01) |

(58) Field of Classification Search
USPC .................................................. 356/5.01
See application file for complete search history.

(56) References Cited

U.S. PATENT DOCUMENTS

| | | | |
|---|---|---|---|
| 3,551,845 | A | 12/1970 | Zelina |
| 3,636,250 | A | 1/1972 | Haeff |
| 3,686,514 | A | 8/1972 | Dube et al. |
| 3,781,111 | A | 12/1973 | Fletcher et al. |
| 3,862,415 | A | 1/1975 | Harnden, Jr. et al. |
| 3,897,150 | A | 7/1975 | Bridges et al. |
| 4,179,216 | A | 12/1979 | Theurer et al. |
| 4,199,697 | A | 4/1980 | Edwards |
| 4,201,442 | A | 5/1980 | McMahon et al. |
| 4,212,534 | A | 7/1980 | Bodlaj |
| 4,220,103 | A | 9/1980 | Kasahara et al. |
| 4,477,184 | A | 10/1984 | Endo |
| 4,516,837 | A | 5/1985 | Soref et al. |
| 4,634,272 | A | 1/1987 | Endo |
| 4,656,462 | A | 4/1987 | Araki et al. |
| 4,681,433 | A | 7/1987 | Aeschlimann |
| 4,700,301 | A | 10/1987 | Dyke |
| 4,742,337 | A | 5/1988 | Haag |
| 4,834,531 | A | 5/1989 | Ward |
| 4,862,257 | A | 8/1989 | Ulich |
| 4,895,440 | A | 1/1990 | Cain et al. |
| 4,896,343 | A | 1/1990 | Saunders |
| 4,902,126 | A | 2/1990 | Koechner |
| 4,944,036 | A | 7/1990 | Hyatt |
| 4,952,911 | A | 8/1990 | D'Ambrosia et al. |
| 4,967,183 | A | 10/1990 | D'Ambrosia et al. |
| 5,004,916 | A | 4/1991 | Collins, Jr. |
| 5,006,721 | A | 4/1991 | Cameron et al. |
| 5,023,888 | A | 6/1991 | Bayston |
| 5,026,156 | A | 6/1991 | Bayston et al. |
| 5,059,008 | A | 10/1991 | Flood et al. |
| 5,175,694 | A | 12/1992 | Amato |
| 5,177,768 | A | 1/1993 | Crespo et al. |
| 5,210,586 | A | 5/1993 | Grage et al. |
| 5,212,533 | A | 5/1993 | Shibuya et al. |
| 5,241,481 | A | 8/1993 | Olsen |
| 5,249,046 | A | 9/1993 | Ulich et al. |
| 5,249,157 | A | 9/1993 | Taylor |
| 5,291,261 | A | 3/1994 | Dahl et al. |
| 5,309,212 | A | 5/1994 | Clark |
| 5,314,037 | A | 5/1994 | Shaw et al. |
| 5,319,201 | A | 6/1994 | Lee |
| 5,365,218 | A | 11/1994 | Otto |
| 5,463,384 | A | 10/1995 | Juds |
| 5,465,142 | A | 11/1995 | Krumes et al. |
| 5,515,156 | A | 5/1996 | Yoshida et al. |
| 5,546,188 | A | 8/1996 | Wangler et al. |
| 5,563,706 | A | 10/1996 | Shibuya et al. |
| 5,572,219 | A | 11/1996 | Silverstein et al. |
| 5,691,687 | A | 11/1997 | Kumagai et al. |
| 5,710,417 | A | 1/1998 | Joseph et al. |
| 5,757,472 | A | 5/1998 | Wangler et al. |
| 5,757,501 | A | 5/1998 | Hipp |
| 5,757,677 | A | 5/1998 | Lennen |
| 5,789,739 | A | 8/1998 | Schwarz |
| 5,793,163 | A | 8/1998 | Okuda |
| 5,793,491 | A | 8/1998 | Wangler et al. |
| 5,805,468 | A | 9/1998 | Blohbaum |
| 5,847,817 | A | 12/1998 | Zediker et al. |
| 5,877,688 | A | 3/1999 | Morinaka et al. |
| 5,889,479 | A | 3/1999 | Tabel |
| 5,895,984 | A | 4/1999 | Renz |
| 5,903,355 | A | 5/1999 | Schwarz |
| 5,903,386 | A | 5/1999 | Mantravadi et al. |
| 5,923,910 | A | 7/1999 | Nakahara et al. |
| 5,942,688 | A | 8/1999 | Kimura et al. |
| 5,949,530 | A | 9/1999 | Wetteborn |
| 5,953,110 | A | 9/1999 | Burns |
| 5,991,011 | A | 11/1999 | Damm |
| 6,034,803 | A | 3/2000 | Sullivan et al. |
| 6,043,868 | A | 3/2000 | Dunne |
| 6,069,565 | A | 5/2000 | Stern et al. |
| 6,088,085 | A | 7/2000 | Wetteborn |
| 6,100,539 | A | 8/2000 | Blumcke et al. |
| 6,137,566 | A | 10/2000 | Leonard et al. |
| 6,153,878 | A | 11/2000 | Jakob et al. |
| 6,157,294 | A | 12/2000 | Urai et al. |
| 6,201,236 | B1 | 3/2001 | Juds |
| 6,259,714 | B1 | 7/2001 | Kinbara |
| 6,297,844 | B1 | 10/2001 | Schatz et al. |
| 6,321,172 | B1 | 11/2001 | Jakob et al. |
| 6,327,806 | B1 | 12/2001 | Paige |
| 6,329,800 | B1 | 12/2001 | May |
| 6,335,789 | B1 | 1/2002 | Kikuchi |
| 6,365,429 | B1 | 4/2002 | Kneissl et al. |
| 6,396,577 | B1 | 5/2002 | Ramstack |
| 6,420,698 | B1 | 7/2002 | Dimsdale |
| 6,441,363 | B1 | 8/2002 | Cook, Jr. et al. |
| 6,441,889 | B1 | 8/2002 | Patterson |
| 6,442,476 | B1 | 8/2002 | Poropat |
| 6,473,079 | B1 | 10/2002 | Kacyra et al. |
| 6,504,712 | B2 | 1/2003 | Hashimoto et al. |
| 6,509,958 | B2 | 1/2003 | Pierenkemper |
| 6,580,385 | B1 * | 6/2003 | Winner ................. G01S 17/931 180/169 |
| 6,593,582 | B2 | 7/2003 | Lee et al. |
| 6,621,764 | B1 | 9/2003 | Smith |
| 6,636,300 | B2 | 10/2003 | Doemens et al. |
| 6,646,725 | B1 | 11/2003 | Eichinger et al. |
| 6,650,402 | B2 | 11/2003 | Sullivan et al. |
| 6,664,529 | B2 | 12/2003 | Pack et al. |
| 6,665,063 | B2 | 12/2003 | Jamieson et al. |
| 6,670,905 | B1 | 12/2003 | Orr |
| 6,682,478 | B2 | 1/2004 | Nakamura |
| 6,710,324 | B2 | 3/2004 | Hipp |
| 6,742,707 | B1 | 6/2004 | Tsikos et al. |
| 6,747,747 | B2 | 6/2004 | Hipp |
| 6,759,649 | B2 | 7/2004 | Hipp |
| 6,789,527 | B2 | 9/2004 | Sauler et al. |
| 6,798,527 | B2 | 9/2004 | Fukumoto et al. |
| 6,812,450 | B2 | 11/2004 | Hipp |
| 6,876,790 | B2 | 4/2005 | Lee |
| 6,879,419 | B2 | 4/2005 | Richman et al. |
| 6,969,558 | B2 | 11/2005 | Walston et al. |
| 7,030,968 | B2 | 4/2006 | D'Aligny et al. |
| 7,041,962 | B2 | 5/2006 | Dollmann et al. |
| 7,089,114 | B1 | 8/2006 | Huang |
| 7,106,424 | B2 | 9/2006 | Meneely et al. |
| 7,129,971 | B2 | 10/2006 | McCutchen |
| 7,130,672 | B2 | 10/2006 | Pewzner et al. |
| 7,131,586 | B2 | 11/2006 | Tsikos et al. |
| 7,190,465 | B2 | 3/2007 | Froehlich et al. |
| 7,240,314 | B1 | 7/2007 | Leung |
| 7,248,342 | B1 | 7/2007 | Degnan |
| 7,281,891 | B2 | 10/2007 | Smith et al. |
| 7,295,298 | B2 | 11/2007 | Willhoeft et al. |
| 7,313,424 | B2 | 12/2007 | Mayevsky et al. |
| 7,315,377 | B2 | 1/2008 | Holland et al. |
| 7,319,777 | B2 | 1/2008 | Morcom |
| 7,345,271 | B2 | 3/2008 | Boehlau et al. |
| 7,358,819 | B2 | 4/2008 | Rollins |
| 7,373,473 | B2 | 5/2008 | Bukowski et al. |
| 7,408,462 | B2 | 8/2008 | Pirkl et al. |
| 7,480,031 | B2 | 1/2009 | Mack |
| 7,544,945 | B2 | 6/2009 | Tan et al. |

(56) References Cited

U.S. PATENT DOCUMENTS

| | | |
|---|---|---|
| 7,570,793 B2 | 8/2009 | Lages et al. |
| 7,583,364 B1 | 9/2009 | Mayor et al. |
| 7,589,826 B2 | 9/2009 | Mack et al. |
| 7,619,477 B2 | 11/2009 | Segarra |
| 7,623,222 B2 | 11/2009 | Benz et al. |
| 7,640,068 B2 | 12/2009 | Johnson et al. |
| 7,642,946 B2 | 1/2010 | Wong et al. |
| 7,684,590 B2 | 3/2010 | Kampchen et al. |
| 7,697,581 B2 | 4/2010 | Walsh et al. |
| 7,741,618 B2 | 6/2010 | Lee et al. |
| 7,746,271 B2 | 6/2010 | Furstenberg |
| 7,868,665 B2 | 1/2011 | Tumer et al. |
| 7,969,558 B2 | 6/2011 | Hall |
| 8,042,056 B2 | 10/2011 | Wheeler et al. |
| 8,077,047 B2 | 12/2011 | Humble et al. |
| 8,139,685 B2 | 3/2012 | Simic et al. |
| 8,203,702 B1 | 6/2012 | Kane et al. |
| 8,274,037 B2 | 9/2012 | Ritter et al. |
| 8,310,653 B2 | 11/2012 | Ogawa et al. |
| 8,605,262 B2 | 12/2013 | Campbell et al. |
| 8,675,181 B2 | 3/2014 | Hall |
| 8,736,818 B2 | 5/2014 | Weimer et al. |
| 8,767,190 B2 | 7/2014 | Hall |
| 8,953,647 B1 | 2/2015 | Mead et al. |
| 8,976,340 B2 | 3/2015 | Gilliland et al. |
| 8,995,478 B1 | 3/2015 | Kobtsev et al. |
| 9,063,549 B1 | 6/2015 | Pennecot |
| 9,069,061 B1 | 6/2015 | Harwit |
| 9,069,080 B2 | 6/2015 | Stettner et al. |
| 9,086,273 B1 | 7/2015 | Gruver et al. |
| 9,093,969 B2 | 7/2015 | Gebeyehu et al. |
| 9,110,154 B1 | 8/2015 | Bates et al. |
| 9,151,940 B2 | 10/2015 | Chuang et al. |
| 9,191,260 B1 * | 11/2015 | Grund .................. G06K 9/0055 |
| 9,194,701 B2 | 11/2015 | Bosch |
| RE45,854 E | 1/2016 | Gittinger et al. |
| 9,239,959 B1 | 1/2016 | Evans et al. |
| 9,246,041 B1 | 1/2016 | Clausen et al. |
| 9,285,477 B1 | 3/2016 | Smith et al. |
| 9,286,538 B1 | 3/2016 | Chen et al. |
| 9,310,197 B2 | 4/2016 | Gogolla et al. |
| 9,383,753 B1 | 7/2016 | Templeton et al. |
| 9,453,914 B2 | 9/2016 | Stettner et al. |
| 9,529,079 B1 | 12/2016 | Droz et al. |
| 9,772,607 B2 | 9/2017 | Decoux et al. |
| RE46,672 E | 1/2018 | Hall |
| 9,958,547 B2 | 5/2018 | Fu et al. |
| 9,964,632 B1 | 5/2018 | Droz et al. |
| 9,983,297 B2 | 5/2018 | Hall et al. |
| 9,989,629 B1 | 6/2018 | LaChapelle |
| 10,003,168 B1 | 6/2018 | Villeneuve |
| 10,018,726 B2 | 7/2018 | Hall et al. |
| 10,048,374 B2 | 8/2018 | Hall et al. |
| 10,094,925 B1 | 10/2018 | LaChapelle |
| 10,109,183 B1 | 10/2018 | Franz et al. |
| 10,120,079 B2 | 11/2018 | Pennecot et al. |
| 10,126,412 B2 | 11/2018 | Eldada et al. |
| 10,132,928 B2 | 11/2018 | Eldada et al. |
| 10,309,213 B2 | 6/2019 | Barfoot et al. |
| 10,330,780 B2 | 6/2019 | Hall et al. |
| 10,386,465 B2 | 8/2019 | Hall et al. |
| 10,393,877 B2 | 8/2019 | Hall et al. |
| 10,436,904 B2 | 10/2019 | Moss et al. |
| 10,545,222 B2 | 1/2020 | Hall et al. |
| RE47,942 E | 4/2020 | Hall |
| 10,613,203 B1 | 4/2020 | Rekow et al. |
| 10,627,490 B2 | 4/2020 | Hall et al. |
| 10,627,491 B2 | 4/2020 | Hall et al. |
| 2001/0011289 A1 | 8/2001 | Davis et al. |
| 2001/0017718 A1 | 8/2001 | Ikeda et al. |
| 2002/0003617 A1 | 1/2002 | Doemens et al. |
| 2002/0060784 A1 | 5/2002 | Pack et al. |
| 2002/0117545 A1 | 8/2002 | Tsikos et al. |
| 2003/0041079 A1 | 2/2003 | Bellemore et al. |
| 2003/0043363 A1 | 3/2003 | Jamieson et al. |
| 2003/0043364 A1 | 3/2003 | Jamieson et al. |
| 2003/0057533 A1 | 3/2003 | Lemmi et al. |
| 2003/0066977 A1 | 4/2003 | Hipp et al. |
| 2003/0076485 A1 | 4/2003 | Ruff et al. |
| 2003/0090646 A1 | 5/2003 | Riegl et al. |
| 2003/0163030 A1 | 8/2003 | Arriaga |
| 2004/0021852 A1 | 2/2004 | DeFlumere |
| 2004/0066500 A1 | 4/2004 | Gokturk et al. |
| 2004/0134879 A1 | 7/2004 | Kochergin et al. |
| 2004/0150810 A1 | 8/2004 | Muenter et al. |
| 2004/0213463 A1 | 10/2004 | Morrison |
| 2004/0240706 A1 | 12/2004 | Wallace et al. |
| 2004/0240710 A1 | 12/2004 | Lages et al. |
| 2004/0247157 A1 | 12/2004 | Lages et al. |
| 2005/0023353 A1 | 2/2005 | Tsikos et al. |
| 2005/0168720 A1 | 8/2005 | Yamashita et al. |
| 2005/0211893 A1 | 9/2005 | Paschalidis |
| 2005/0232466 A1 | 10/2005 | Kampchen et al. |
| 2005/0246065 A1 | 11/2005 | Ricard |
| 2005/0248749 A1 | 11/2005 | Kiehn et al. |
| 2005/0279914 A1 | 12/2005 | Dimsdale et al. |
| 2006/0007350 A1 | 1/2006 | Gao et al. |
| 2006/0089765 A1 | 4/2006 | Pack et al. |
| 2006/0100783 A1 | 5/2006 | Haberer et al. |
| 2006/0115113 A1 | 6/2006 | Lages et al. |
| 2006/0132635 A1 | 6/2006 | Land |
| 2006/0176697 A1 | 8/2006 | Arruda |
| 2006/0186326 A1 | 8/2006 | Ito |
| 2006/0197867 A1 | 9/2006 | Johnson et al. |
| 2006/0231771 A1 | 10/2006 | Lee et al. |
| 2006/0290920 A1 | 12/2006 | Kampchen et al. |
| 2007/0035624 A1 | 2/2007 | Lubard et al. |
| 2007/0071056 A1 | 3/2007 | Chen |
| 2007/0121095 A1 | 5/2007 | Lewis |
| 2007/0181810 A1 | 8/2007 | Tan et al. |
| 2007/0201027 A1 | 8/2007 | Doushkina et al. |
| 2007/0219720 A1 | 9/2007 | Trepagnier et al. |
| 2007/0241955 A1 | 10/2007 | Brosche |
| 2007/0272841 A1 | 11/2007 | Wiklof |
| 2008/0002176 A1 | 1/2008 | Krasutsky |
| 2008/0013896 A1 | 1/2008 | Salzberg et al. |
| 2008/0074640 A1 | 3/2008 | Walsh et al. |
| 2008/0079371 A1 | 4/2008 | Kang et al. |
| 2008/0154495 A1 | 6/2008 | Breed |
| 2008/0170826 A1 | 7/2008 | Schaafsma |
| 2008/0186501 A1 | 8/2008 | Xie |
| 2008/0302971 A1 * | 12/2008 | Hyde .................... G01J 3/0237 |
| | | 250/394 |
| 2009/0010644 A1 | 1/2009 | Varshneya et al. |
| 2009/0026503 A1 | 1/2009 | Tsuda |
| 2009/0085901 A1 | 4/2009 | Antony |
| 2009/0122295 A1 | 5/2009 | Eaton |
| 2009/0142053 A1 | 6/2009 | Varshneya et al. |
| 2009/0168045 A1 | 7/2009 | Lin et al. |
| 2009/0218475 A1 | 9/2009 | Kawakami et al. |
| 2009/0245788 A1 | 10/2009 | Varshneya et al. |
| 2009/0323737 A1 | 12/2009 | Ensher et al. |
| 2010/0006760 A1 | 1/2010 | Lee et al. |
| 2010/0020306 A1 | 1/2010 | Hall |
| 2010/0045965 A1 | 2/2010 | Meneely |
| 2010/0046953 A1 | 2/2010 | Shaw et al. |
| 2010/0074532 A1 * | 3/2010 | Gordon .................. G06T 7/536 |
| | | 382/203 |
| 2010/0134596 A1 | 6/2010 | Becker |
| 2010/0188722 A1 | 7/2010 | Yamada et al. |
| 2010/0198487 A1 | 8/2010 | Vollmer et al. |
| 2010/0204964 A1 | 8/2010 | Pack et al. |
| 2010/0239139 A1 | 9/2010 | Hunt et al. |
| 2010/0258708 A1 * | 10/2010 | Meyers .................. G01S 17/89 |
| | | 356/5.1 |
| 2010/0265077 A1 | 10/2010 | Humble et al. |
| 2010/0271615 A1 | 10/2010 | Sebastian et al. |
| 2010/0302528 A1 | 12/2010 | Hall |
| 2011/0028859 A1 | 2/2011 | Chian |
| 2011/0040482 A1 | 2/2011 | Brimble et al. |
| 2011/0211188 A1 | 9/2011 | Juenemann et al. |
| 2011/0216304 A1 | 9/2011 | Hall |
| 2011/0305250 A1 | 12/2011 | Chann et al. |
| 2012/0038903 A1 | 2/2012 | Weimer et al. |

(56) References Cited

U.S. PATENT DOCUMENTS

| | | |
|---|---|---|
| 2012/0195597 A1 | 8/2012 | Malaney |
| 2012/0287417 A1 | 11/2012 | Mimeault |
| 2013/0024176 A2 | 1/2013 | Woodford |
| 2013/0050144 A1 | 2/2013 | Reynolds |
| 2013/0050486 A1 | 2/2013 | Omer et al. |
| 2013/0070239 A1 | 3/2013 | Crawford et al. |
| 2013/0094960 A1 | 4/2013 | Bowyer et al. |
| 2013/0151198 A1 | 6/2013 | Brown |
| 2013/0168673 A1 | 7/2013 | Yu et al. |
| 2013/0206967 A1 | 8/2013 | Shpunt et al. |
| 2013/0241761 A1 | 9/2013 | Cooper et al. |
| 2013/0242283 A1 | 9/2013 | Bailey et al. |
| 2013/0258312 A1* | 10/2013 | Lewis .................... G01S 17/10 356/4.01 |
| 2013/0286404 A1 | 10/2013 | Cenko et al. |
| 2013/0300479 A1 | 11/2013 | Thibault |
| 2013/0314711 A1 | 11/2013 | Cantin et al. |
| 2013/0336375 A1 | 12/2013 | Ranki et al. |
| 2013/0342366 A1 | 12/2013 | Kiefer et al. |
| 2014/0063483 A1 | 3/2014 | Li |
| 2014/0071234 A1 | 3/2014 | Millett |
| 2014/0078519 A1 | 3/2014 | Steffey et al. |
| 2014/0104592 A1 | 4/2014 | Tien et al. |
| 2014/0240317 A1 | 8/2014 | Go et al. |
| 2014/0240721 A1 | 8/2014 | Herschbach |
| 2014/0253369 A1 | 9/2014 | Kelley et al. |
| 2014/0267848 A1 | 9/2014 | Wu |
| 2014/0274093 A1 | 9/2014 | Abdelmonem |
| 2014/0347650 A1 | 11/2014 | Bosch |
| 2015/0015895 A1 | 1/2015 | Bridges et al. |
| 2015/0035437 A1 | 2/2015 | Panopoulos et al. |
| 2015/0055117 A1 | 2/2015 | Pennecot et al. |
| 2015/0101234 A1 | 4/2015 | Priest et al. |
| 2015/0116695 A1 | 4/2015 | Bartolome et al. |
| 2015/0131080 A1 | 5/2015 | Retterath et al. |
| 2015/0144806 A1 | 5/2015 | Jin et al. |
| 2015/0185325 A1 | 7/2015 | Park et al. |
| 2015/0202939 A1 | 7/2015 | Stettner et al. |
| 2015/0219765 A1 | 8/2015 | Mead et al. |
| 2015/0226853 A1 | 8/2015 | Seo et al. |
| 2015/0293224 A1 | 10/2015 | Eldada et al. |
| 2015/0293228 A1 | 10/2015 | Retterath et al. |
| 2015/0303216 A1 | 10/2015 | Tamaru |
| 2016/0003946 A1 | 1/2016 | Gilliland et al. |
| 2016/0009410 A1 | 1/2016 | Derenick et al. |
| 2016/0014309 A1 | 1/2016 | Ellison et al. |
| 2016/0021713 A1 | 1/2016 | Reed |
| 2016/0049058 A1 | 2/2016 | Allen et al. |
| 2016/0098620 A1* | 4/2016 | Geile .................... G06K 9/469 382/103 |
| 2016/0117431 A1 | 4/2016 | Kim et al. |
| 2016/0161600 A1 | 6/2016 | Eldada et al. |
| 2016/0191173 A1 | 6/2016 | Malaney |
| 2016/0259038 A1 | 9/2016 | Retterath et al. |
| 2016/0300484 A1 | 10/2016 | Torbett |
| 2016/0306032 A1 | 10/2016 | Schwarz et al. |
| 2016/0313445 A1 | 10/2016 | Bailey et al. |
| 2016/0363659 A1 | 12/2016 | Mindell et al. |
| 2016/0365846 A1 | 12/2016 | Wyland |
| 2017/0146639 A1 | 5/2017 | Carothers |
| 2017/0146640 A1 | 5/2017 | Hall et al. |
| 2017/0153319 A1 | 6/2017 | Villeneuve et al. |
| 2017/0214861 A1 | 7/2017 | Rachlin et al. |
| 2017/0219695 A1 | 8/2017 | Hall et al. |
| 2017/0220876 A1 | 8/2017 | Gao et al. |
| 2017/0242102 A1 | 8/2017 | Dussan et al. |
| 2017/0269198 A1 | 9/2017 | Hall et al. |
| 2017/0269209 A1 | 9/2017 | Hall et al. |
| 2017/0269215 A1 | 9/2017 | Hall et al. |
| 2017/0299721 A1 | 10/2017 | Eichenholz et al. |
| 2017/0350983 A1 | 12/2017 | Hall et al. |
| 2018/0019155 A1 | 1/2018 | Tsang et al. |
| 2018/0058197 A1 | 3/2018 | Barfoot et al. |
| 2018/0059219 A1 | 3/2018 | Irish et al. |
| 2018/0074382 A1 | 3/2018 | Lee et al. |
| 2018/0100924 A1 | 4/2018 | Brinkmeyer |
| 2018/0106902 A1 | 4/2018 | Mase et al. |
| 2018/0168539 A1 | 6/2018 | Singh et al. |
| 2018/0267151 A1 | 9/2018 | Hall et al. |
| 2018/0275249 A1 | 9/2018 | Campbell et al. |
| 2018/0284227 A1 | 10/2018 | Hall et al. |
| 2018/0284274 A1 | 10/2018 | LaChapelle |
| 2018/0321360 A1 | 11/2018 | Hall et al. |
| 2018/0364098 A1 | 12/2018 | McDaniel et al. |
| 2019/0001442 A1 | 1/2019 | Unrath et al. |
| 2019/0011563 A1 | 1/2019 | Hall et al. |
| 2019/0178991 A1 | 6/2019 | Hall et al. |
| 2019/0339365 A1 | 11/2019 | Hall et al. |
| 2019/0361092 A1 | 11/2019 | Hall et al. |
| 2019/0369257 A1 | 12/2019 | Hall et al. |
| 2019/0369258 A1 | 12/2019 | Hall et al. |
| 2020/0064452 A1 | 2/2020 | Avlas et al. |
| 2020/0142070 A1 | 5/2020 | Hall et al. |
| 2020/0144971 A1 | 5/2020 | Pinto et al. |
| 2020/0166613 A1 | 5/2020 | Hall et al. |
| 2020/0191915 A1 | 6/2020 | Hall et al. |

FOREIGN PATENT DOCUMENTS

| | | |
|---|---|---|
| CN | 1106534 A | 8/1995 |
| CN | 1576123 A | 2/2005 |
| CN | 2681085 Y | 2/2005 |
| CN | 2773714 Y | 4/2006 |
| CN | 102798866 A | 11/2012 |
| CN | 103064087 A | 4/2013 |
| CN | 103616696 A | 3/2014 |
| DE | 930909 C | 7/1955 |
| DE | 3134815 A1 | 3/1983 |
| DE | 3216312 A1 | 11/1983 |
| DE | 3216313 A1 | 11/1983 |
| DE | 3701340 A1 | 7/1988 |
| DE | 3741259 A1 | 6/1989 |
| DE | 3808972 A1 | 10/1989 |
| DE | 3821892 C1 | 2/1990 |
| DE | 4040894 C1 | 4/1992 |
| DE | 4115747 A1 | 11/1992 |
| DE | 4124192 A1 | 1/1993 |
| DE | 4127168 A1 | 2/1993 |
| DE | 4137550 A1 | 3/1993 |
| DE | 4215272 A1 | 11/1993 |
| DE | 4243631 A1 | 6/1994 |
| DE | 4340756 A1 | 6/1994 |
| DE | 4411448 A1 | 10/1995 |
| DE | 4412044 A1 | 10/1995 |
| DE | 19512644 A1 | 10/1996 |
| DE | 19512681 A1 | 10/1996 |
| DE | 4345446 C2 | 7/1998 |
| DE | 4345448 C2 | 7/1998 |
| DE | 19727792 A1 | 2/1999 |
| DE | 19741730 A1 | 4/1999 |
| DE | 19741731 A1 | 4/1999 |
| DE | 19752145 A1 | 5/1999 |
| DE | 19717399 A1 | 6/1999 |
| DE | 19757847 A1 | 7/1999 |
| DE | 19757848 A1 | 7/1999 |
| DE | 19757849 A1 | 7/1999 |
| DE | 19757840 C1 | 9/1999 |
| DE | 19815149 A1 | 10/1999 |
| DE | 19828000 A1 | 1/2000 |
| DE | 19902903 C1 | 5/2000 |
| DE | 19911375 A1 | 9/2000 |
| DE | 19919925 A1 | 11/2000 |
| DE | 19927501 A1 | 11/2000 |
| DE | 19936440 A1 | 3/2001 |
| DE | 19953006 A1 | 5/2001 |
| DE | 19953007 A1 | 5/2001 |
| DE | 19953009 A1 | 5/2001 |
| DE | 19953010 A1 | 5/2001 |
| DE | 10025511 C1 | 12/2001 |
| DE | 10110420 A1 | 9/2002 |
| DE | 10114362 A1 | 10/2002 |
| DE | 10127417 A1 | 12/2002 |
| DE | 10128954 A1 | 12/2002 |
| DE | 10141055 A1 | 3/2003 |

(56) References Cited

FOREIGN PATENT DOCUMENTS

| | | |
|---|---|---|
| DE | 10143060 A1 | 3/2003 |
| DE | 10146692 A1 | 4/2003 |
| DE | 10148070 A1 | 4/2003 |
| DE | 10151983 A1 | 4/2003 |
| DE | 10162668 A1 | 7/2003 |
| DE | 10217295 A1 | 11/2003 |
| DE | 10222797 A1 | 12/2003 |
| DE | 10229408 A1 | 1/2004 |
| DE | 10244638 A1 | 4/2004 |
| DE | 10244640 A1 | 4/2004 |
| DE | 10244643 A1 | 4/2004 |
| DE | 10258794 A1 | 6/2004 |
| DE | 10303015 A1 | 8/2004 |
| DE | 10331529 A1 | 1/2005 |
| DE | 10341548 A1 | 3/2005 |
| DE | 102004010197 A1 | 9/2005 |
| DE | 102004014041 A1 | 10/2005 |
| DE | 102005050824 A1 | 5/2006 |
| DE | 102005003827 A1 | 7/2006 |
| DE | 102005019233 A1 | 11/2006 |
| DE | 102007013023 A1 | 9/2008 |
| DE | 202015009250 U1 | 1/2017 |
| EP | 0185816 A1 | 7/1986 |
| EP | 0361188 A2 | 4/1990 |
| EP | 0396865 A2 | 11/1990 |
| EP | 0412395 A1 | 2/1991 |
| EP | 0412398 A1 | 2/1991 |
| EP | 0412399 A1 | 2/1991 |
| EP | 0412400 A1 | 2/1991 |
| EP | 0468175 A2 | 1/1992 |
| EP | 0468175 A2 | 1/1992 |
| EP | 0486430 A2 | 5/1992 |
| EP | 0653720 A2 | 5/1995 |
| EP | 0656868 A1 | 6/1995 |
| EP | 0897120 A2 | 2/1999 |
| EP | 0913707 A1 | 5/1999 |
| EP | 0937996 A2 | 8/1999 |
| EP | 0967492 A1 | 12/1999 |
| EP | 1046938 A2 | 10/2000 |
| EP | 1055937 A2 | 11/2000 |
| EP | 1148345 A1 | 10/2001 |
| EP | 1160718 A2 | 12/2001 |
| EP | 1174733 A2 | 1/2002 |
| EP | 1267177 A1 | 12/2002 |
| EP | 1267178 A1 | 12/2002 |
| EP | 1286178 A2 | 2/2003 |
| EP | 1286181 A1 | 2/2003 |
| EP | 1288677 A2 | 3/2003 |
| EP | 1291673 A2 | 3/2003 |
| EP | 1291674 A2 | 3/2003 |
| EP | 1298012 A2 | 4/2003 |
| EP | 1298453 A2 | 4/2003 |
| EP | 1298454 A2 | 4/2003 |
| EP | 1300715 A2 | 4/2003 |
| EP | 1302784 A2 | 4/2003 |
| EP | 1304583 A2 | 4/2003 |
| EP | 1306690 A2 | 5/2003 |
| EP | 1308747 A2 | 5/2003 |
| EP | 1355128 A1 | 10/2003 |
| EP | 1403657 A1 | 3/2004 |
| EP | 1408318 A1 | 4/2004 |
| EP | 1418444 A1 | 5/2004 |
| EP | 1460454 A2 | 9/2004 |
| EP | 1475764 A2 | 11/2004 |
| EP | 1515157 A1 | 3/2005 |
| EP | 1531342 A1 | 5/2005 |
| EP | 1531343 A1 | 5/2005 |
| EP | 1548351 A2 | 6/2005 |
| EP | 1557691 A1 | 7/2005 |
| EP | 1557692 A1 | 7/2005 |
| EP | 1557693 A1 | 7/2005 |
| EP | 1557694 A1 | 7/2005 |
| EP | 1700763 A2 | 9/2006 |
| EP | 1914564 A1 | 4/2008 |
| EP | 1927867 A1 | 6/2008 |
| EP | 1939652 A1 | 7/2008 |
| EP | 1947377 A1 | 7/2008 |
| EP | 1983354 A1 | 10/2008 |
| EP | 2003471 A1 | 12/2008 |
| EP | 2177931 A2 | 4/2010 |
| GB | 2041687 A | 9/1980 |
| JP | H05240940 A | 9/1993 |
| JP | H03-006407 | 2/1994 |
| JP | H6-288725 A | 10/1994 |
| JP | 11264871 | 9/1999 |
| JP | 2001-256576 A | 9/2001 |
| JP | 2002-031528 A | 1/2002 |
| JP | 2003-336447 A | 11/2003 |
| JP | 2004-348575 A | 12/2004 |
| JP | 2005-070840 A | 3/2005 |
| JP | 2005-297863 A | 10/2005 |
| JP | 2006-177843 A | 7/2006 |
| WO | WO-1999/003080 A1 | 1/1999 |
| WO | WO-2000/025089 A1 | 5/2000 |
| WO | WO-01/31608 A1 | 5/2001 |
| WO | WO-03/019234 A1 | 3/2003 |
| WO | WO-03/040755 A1 | 5/2003 |
| WO | WO-2004/019293 A2 | 3/2004 |
| WO | WO-2004/036245 A2 | 4/2004 |
| WO | WO-2008/008970 A2 | 1/2008 |
| WO | WO-2009/120706 A2 | 10/2009 |
| WO | WO-2015/104572 A1 | 7/2015 |
| WO | WO-2016/162568 A1 | 10/2016 |
| WO | WO-2017/089063 A1 | 6/2017 |
| WO | WO-2017/132703 A1 | 8/2017 |
| WO | WO-2017/164989 A1 | 9/2017 |
| WO | WO-2017/165316 A1 | 9/2017 |
| WO | WO-2018/125823 A1 | 7/2018 |
| WO | WO-2018/196001 A1 | 11/2018 |

OTHER PUBLICATIONS

U.S. Appl. No. 16/510,680, filed Jul. 12, 2019, Hall et al.
U.S. Appl. No. 16/510,710, filed Jul. 12, 2019, Hall et al.
U.S. Appl. No. 16/510,749, filed Jul. 12, 2019, Hall et al.
U.S. Appl. No. 15/420,384, filed Jan. 31, 2017, Hall et al.
U.S. Appl. No. 16/030,780, filed Jul. 9, 2018, Hall et al.
U.S. Appl. No. 11/777,802, filed Jul. 13, 2007, Hall.
U.S. Appl. No. 13/109,901, filed May 17, 2011, Hall et al.
U.S. Appl. No. 15/180,580, filed Jun. 13, 2016, Hall et al.
U.S. Appl. No. 15/700,543, filed Sep. 11, 2017, Hall et al.
U.S. Appl. No. 15/700,558, filed Sep. 11, 2017, Hall et al.
U.S. Appl. No. 15/700,571, filed Sep. 11, 2017, Hall et al.
U.S. Appl. No. 15/700,836, filed Sep. 11, 2017, Hall et al.
U.S. Appl. No. 15/700,844, filed Sep. 11, 2017, Hall et al.
U.S. Appl. No. 15/700,959, filed Sep. 11, 2017, Hall et al.
U.S. Appl. No. 15/700,965, filed Sep. 11, 2017, Hall et al.
U.S. Appl. No. 16/912,648, filed Jun. 25, 2020, Hall et al.
U.S. Appl. No. 15/926,095, filed Mar. 30, 2018, Hall et al.
U.S. Appl. No. 15/464,227, filed Mar. 30, 2017, Hall et al.
U.S. Appl. No. 15/464,221, filed Mar. 30, 2017, Hall et al.
U.S. Appl. No. 15/974,527, filed May 8, 2018, Hall et al.
U.S. Appl. No. 16/748,498, filed Jan. 21, 2020, Hall et al.
U.S. Appl. No. 15/610,975, filed Jun. 1, 2017, Hall et al.
U.S. Appl. No. 16/546,131, filed Aug. 20, 2019, Hall et al.
U.S. Appl. No. 16/842,491, filed Apr. 7, 2020, Hall et al.
U.S. Appl. No. 16/546,184, filed Aug. 20, 2019, Hall et al.
U.S. Appl. No. 16/546,206, filed Aug. 20, 2019, Hall et al.
U.S. Appl. No. 16/909,306, filed Jun. 23, 2020, Hall et al.
U.S. Appl. No. 15/339,790, filed Oct. 31, 2016, Hall et al.
U.S. Appl. No. 16/854,755, filed Apr. 21, 2020, Hall et al.
U.S. Appl. No. 16/905,843, filed Jun. 18, 2020, Hall et al.
U.S. Appl. No. 16/905,849, filed Jun. 18, 2020, Hall et al.
U.S. Appl. No. 15/835,983, filed Dec. 8, 2017, Hall et al.
U.S. Appl. No. 16/459,557, filed Jul. 1, 2019, Rekow et al.
U.S. Appl. No. 16/841,506, filed Apr. 6, 2020, Rekow et al.
U.S. Appl. No. 16/112,273, filed Aug. 24, 2018, Avlas et al.
U.S. Appl. No. 16/181,523, filed Nov. 6, 2018, Pinto et al.
U.S. Appl. No. 16/241,849, filed Jan. 7, 2019, Hall et al.
U.S. Appl. No. 16/241,963, filed Jan. 7, 2019, Hall et al.

(56) References Cited

OTHER PUBLICATIONS

*Quanergy Systems, Inc.* v. *Velodyne Lidar, Inc.* (N.D. Cal.), filed Sep. 13, 2016, U.S. Pat. No. 7,969,558.
*Velodyne Lidar, Inc.* v. *Hesai Photonics Technology Co., Ltd.*, (N.D. Cal.), filed Aug. 13, 2019, U.S. Pat. No. 7,969,558.
*Velodyne Lidar, Inc.* v. *Suteng Innovation Technology Co., Ltd*, (N.D. Cal.), filed Aug. 13, 2019, U.S. Pat. No. 7,969,558
In re Certain Rotating 3-D Lidar Devices, Components Thereof, and Sensing Systems Containing the Same (ITC), Investigation No. ITC-337-TA-1173, filed Aug. 15, 2019, U.S. Pat. No. 7,696,558.
Petition for Inter Partes Review (USPTO Patent Trial and Appeal Board), Case No. IPR2018-00255, filed Nov. 29, 2017, U.S. Pat. No. 7,969,558.
Petition for Inter Partes Review (USPTO Patent Trial and Appeal Board), Case No. IPR2018-000255, filed Nov. 29, 2017, U.S. Pat. No. 7,969,558.
Accetta et al., Active Electro-Optical Systems, The Infrared and Electro-Optical Systems Handbook (1993, ed. by Clifton Fox), pp. 3-76. (IPR Nos. '255 and '256 Exhibit 2158).
Acuity Laser, Principles Of Measurement Used By Laser Sensors, https://www.acuitylaser.com/measurement-principles (2018), 4 pages. (IPR Nos. '255 and '256 Exhibit 1075).
Acuity, Acuity Aluminum Billet Scalping Production Information webpage (Brennan Deposition Exhibit 14) (last visited Dec. 28, 2018), 2 pages. (IPR Nos. '255 and '256 Exhibit 2184).
Acuity, Acuity AR700 Laser Displacement Sensor Product Information webpage (Brennan Deposition Exhibit 13) (last visited Dec. 28, 2018), 9 pages. (IPR Nos. '255 and '256 Exhibit 2183).
Acuity, Acuity Drill Pipe Runout Product Information webpage (Brennan Deposition Exhibit 12) (last visited Dec. 28, 2018), 2 pages. (IPR Nos. '255 and '256 Exhibit 2182).
Acuity, Acuity Short Range Sensors Product Information webpage (Brennan Deposition Exhibit 11) (last visited Dec. 30, 2018), 3 pages. (IPR Nos. '255 and '256 Exhibit 2181).
Aiestaran et al. "A Fluorescent Linear Optical Fiber Position Sensor" Elsevier B.V. May 21, 2008 (4 pages).
Albota, "Three-dimensional imaging laser RADAR with a photon-counting avalanche photodiode array and microchip laser," Applied optics, vol. 41, No. 36 (Dec. 20, 2002), 8 pages.
Alhashimi, et al., Statistical Modeling and Calibration of Triangulation Lidars, SCITEPRESS—Science and Technology Publications (2016), pp. 308-317. (IPR Nos. '255 and '256 Exhibit 1069).
Amann, Laser ranging: a critical review of usual techniques for distance measurement, 40(1) Society of Photo-Optical Instrumentation Engineers (Jan. 2001), pp. 10-19. (IPR Nos. '255 and '256 Exhibit 2148).
American National Standard for Safe Use of Lasers, ANSI Z136.1-2014, Laser Institute of America (Dec. 10, 2013), pp. 27-34 and 216-219. (IPR Nos. '255 and '256 Exhibit 1142).
American National Standard for Safe Use of Lasers, Laser Institute of America (Jun. 28, 2000), 184 pages. (IPR Nos. '255 and '256 Exhibit 2005).
American National Standards Institute, "Procedures for the Development and Coordination of American National Standards" (Mar. 22, 1995), 50 pages. (IPR Nos. '255 and '256 Exhibit 1040).
American Petroleum Institute, "Specification for Line Pipe," API Specification 5L, 43rd Ed. (2004), 166 pages. (IPR Nos. '255 and '256 Exhibit 1139).
Aood Technology Limited, "Electrical Slip Rings vs. Rotating Electrical Connectors" (2013), 3 pages. (IPR Nos. '255 and '256 Exhibit 1032).
Aufrere, et al., Perception for collision avoidance and autonomous driving, The Robots Institute, Carnegie Mellon University (2003), 14 pages (IPR Nos. '255 and '256 Exhibit 2140).
Aull, et al., "Geiger-Mode Avalanche Photodiodes for Three Dimensional Imaging," Lincoln Laboratory Journal (2002), 16 pages. (IPR Nos. '255 and '256 Exhibit 1021), Lincoln Laboratory Journal, vol. 13, No. 2, 2002, pp. 335-350.

Automotive Lidar, Market Presentation titled "Robotic Cars LiDAR Market in Million Dollars" (Apr. 2018), 86 pages. (IPR Nos. '255 and '256 Exhibit 2113).
Avalanche Photodiode: A User Guide (2011), 8 pages. (IPR Nos. '255 and '256 Exhibit 1019).
Beer, et al., Mechanics of Materials, McGraw Hill Companies, 4th Ed. (2006), pp. 750 and 752. (IPR Nos. '255 and '256 Exhibit 1140).
Berkovic et al., Optical Methods for Distance and Displacement Measurements, Advances in Optics and Photonics (Sep. 11, 2012), pp. 441-471. (IPR Nos. '255 and '256 Exhibit 2007).
Besl, Active, Optical Range Imaging Sensors Machine Visions and Applications (1988), Springer-Verlag New York Inc., pp. 1:127-152 (IPR Nos. '255 and '256 Exhibit 1015).
Blais, NRC-CNRC, Review of 20 Years of Range Sensor Development, National Research Council Canada (Jan. 2004), pp. 231-243 (IPR Nos. '255 and '256 Exhibit 2141).
Bordone, et al., "Development of a high-resolution laser radar for 3D imaging in artwork cataloging," Proceedings of SPIE, vol. 5131 (2003), 6 pages. (IPR Nos. '255 and '256 Exhibit 1016).
Bornstein, "Where am I? Sensors and Methods for Mobile Robot Positioning" (1996), pp. 95-112.
Brennan, Drawing of I-beam by Dr. Brennan (Brennan Deposition Exhibit 16), (Jan. 4, 2019), 1 page. (IPR Nos. '255 and '256 Exhibit 2186).
Brustein et al., How a Billion-Dollar Autonomous Vehicle Startup Lost Its Way, Bloomberg https://www.bloomberg.com/news/features/2018-08-13/how-a-billiondollar-autonomous-vehicle-startup-lost-its-way (Aug. 13, 2018), 7 pages. (IPR Nos. '255 and '256 Exhibit 2098).
Business Wire, Press Release Distribution webpage, https://services.businesswire.com/press-release-distribution (Dec. 21, 2018), 2 pages. (IPR Nos. '255 and '256 Exhibit 1143).
Businesswire, Velodyne Displays Solid State, Highest Performing LiDAR for ADAS, Businesswire https://www.businesswire.com/news/home/20180107005088/en/Velodyne-Displays-Solid-State-Highest-Performing-LiDAR (Jan. 7, 2018), 2 pages. (IPR Nos. '255 and '256 Exhibit 2097).
Businesswire, Velodyne LiDar Awarded "Industry Choice Company of the Year" at TU-Automotive Detroit Conference, Businesswire, https://www.businesswire.com/news/home/20180608005700/en/Velodyne-LiDAR-Awarded-%E2%80%9CIndustry-Choice-Company-Year%E2%80%9D (Jun. 8, 2018), 1 page. (IPR Nos. '255 and '256 Exhibit 2096).
Cameron, An Introduction to LIDAR: The Key Self-Driving Car Sensor, Voyage https://news.voyage.auto/an-introduction-to-lidar-the-key-self-drivingcar-sensor-a7e405590cff (May 9, 2017), 14 pages. (IPR Nos. '255 and '256 Exhibit 2074).
Canadian Patent Office, Office Action, App. No. CA 3,012,003 (Aug. 28, 2019), 3 pages.
Canadian Patent Office, Office Action, App. No. CA 3,017,735 (Aug. 28, 2019), 3 pages.
Canadian Patent Office, Office Action, App. No. CA 3,017,811 (Aug. 28, 2019), 3 pages.
Canbus, https://web.archive.org/web/20040520021138/ http:/canbus.us:80/ (May 20, 2004), 3 pages. (IPR Nos. '255 and '256 Exhibit 1088).
Carson, N. "Defending GPS against the Spoofing Threat using Network Based Detection and 3, 15,20 Successive Interference Cancellation". Auburn University. Nov. 2015, 35 pages.
Chapman, "Introduction to Laser Safety" (Sep. 10, 2007), 19 pages.
Chellapilla, Lidar: The Smartest Sensor on a Self Driving Car, LinkedIn.com https://www.linkedin.com/pulse/lidar-smartest-sensor-self-driving-carkumar-chellapill (Jul. 31, 2017), 8 pages. (IPR Nos. '255 and '256 Exhibit 2075).
Cheung, Spinning laser maker is the real winner of the Urban Challenge, Tech Guru Daily, available at http://www.tgdaily.com/trendwatch-features/34750-spinning-laser-maker-is-the-real-winner (Nov. 7, 2007), 7 pages. (IPR Nos. '255 and '256 Exhibit 2091).
Code of Federal Regulations, Food and Drugs Rule—Performance Standards for Light—Emitting Products, 21 C.F.R. § 1040.10 (2005).

(56) References Cited

OTHER PUBLICATIONS

Copper Development Association Inc., Copper Tube Handbook—Industry Standard Guide for the Design and Installation of Copper Piping Systems, CDA Publication A4015-14.17: Copper Tube Handbook (2016), 96 pages. (IPR Nos. '255 and '256 Exhibit 2139).
Cravotta, "Operating alone," EDN (Dec. 5, 2005), 6 pages.
D'Allegro, Meet the Inventor Trying to Bring LiDAR to the Masses, The Drive http://www.thedrive.com/sheetmetal/15567/meet-the-inventor-trying-to bring-lidar-to-the-masses (Oct. 28, 2017), 5 pages. (IPR Nos. '255 and '256 Exhibit 2072).
Daido, Daido Special Steel Co. home page, https://web.archive.org/web/20051227070229/http:/daido.co.jp/ (Dec. 27, 2005), 1 page. (IPR Nos. '255 and '256 Exhibit 1087).
Daido, Daido steel drilling equipment page, https://web.archive.org/web/20050406120958/ http:/www.daido.co.jp:80/english/products/applipro/energy/dri.html (Apr. 6, 2005), 1 page. (IPR Nos. '255 and '256 Exhibit 1083).
Daido, Daido steel petroleum components, https://web.archive.org/web/20050406121643/ http:/www.daido.co.jp:80/english/products/applipro/energy/petro.htm (Apr. 6, 2005), 1 page. (IPR Nos. '255 and '256 Exhibit 1084).
Daido, Daido steel rebar page, https://web.archive.org/web/20051201010951/ http:/www.daido.co.jp:80/products/stainless/ik_shokai.html (Dec. 1, 2005), 2 pages. (IPR Nos. '255 and '256 Exhibit 1086).
DARPA, 2005 DARPA Challenge Info page https://web.archive.org/web/20051214033009/ http:/www.darpa.mil:80/grandchallenge/ (Nov. 17, 2005), 1 page. (IPR Nos. '255 and '256 Exhibit 1092).
DARPA, 2005 DARPA Team Papers https://web.archive.org/web/20051213010211/ http:/www.darpa.mil:80/grandchallenge/techpapers.html (Dec. 13, 2005), 2 pages. (IPR Nos. '255 and '256 Exhibit 1093).
DARPA, Grand Challenge '05—Frequently Asked Questions, DARPA.com, http://archive.darpa.mil/grandchallenge05/qa.html ) (2005), 3 pages. (IPR Nos. '255 and '256 Exhibit 2143).
DARPA, Grand Challenge Media—Frequently Asked Questions (Media), DARPA.com, http://archive.darpa.mil/grandchallenge04/media_faq.htm (2004), 3 pages. (IPR Nos. '255 and '256 Exhibit 2142).
DARPA, PDF found on Team DAD paper URL, https://web.archive.org/web/20051213015642/ http:/www.darpa.mil:80/grandchallenge/TechPapers/TeamDAD.pdf (Aug. 6, 2005), pp. 1-12. (IPR Nos. '255 and '256 Exhibit 1094).
DARPA, Urban Challenge, DARPA.com, http://archive.darpa.mil/grandchallenge/ ("DARPA Archive") (2007), 4 pages. (IPR Nos. '255 and '256 Exhibit 2144).
Dehong, et al., Design and Implementation of LiDAR Navigation System Based On Triangulation Measurement, 29th Chinese Control and Decision Conference (CCDC) (May 2017), 59 pages. (IPR Nos. '255 and '256 Exhibit 1136).
Doyle, Velodyne HDL-64E Laser Rangefinder (LIDAR) Pseudo-Disassembled, Hizook (Jan. 4, 2009), 7 pages. (IPR Nos. '255 and '256 Exhibit 2046).
Engineering Toolbox, The Engineering Toolbox Copper Tubes—ASTM B88 Datasheet (last accessed Jul. 10, 2018), 4 pages. (IPR Nos. '255 and '256 Exhibit 2137).
English, et al., The Complementary Nature of triangulation and ladar technologies, 5791 Proceedings of SPIE (May 19, 2005), pp. 29-41. (IPR Nos. '255 and '256 Exhibit 2162).
Esacademy, Betting on CAN, https://web.archive.org/web/20040609170940/ http:/www.esacademy.com:80/faq/docs/bettingcan/traditional.htm (Jun. 9, 2004), 1 page. (IPR Nos. '255 and '256 Exhibit 1089).
European Patent Office, Office Action, App. No. EP 07840406.8 (dated Mar. 15, 2011) 7 pages.
European Patent Office, Office Action, App. No. EP 11166432.2 (dated Jan. 29, 2019), 3 pages.
European Patent Office, Office Action, App. No. EP 11166432.2 (dated Oct. 14, 2016), 4 pages.
European Patent Office, Office Action, App. No. EP 11166432.2 (dated Oct. 5, 2015), 4 pages.
European Patent Office, Office Action, App. No. EP 11166432.2 (dated Oct. 7, 2019), 6 pages.
Ewald et al., Object Detection with Laser Scanners for Automotive Applications, IFAC Control in Transportation Systems (2000), pp. 369-372. (IPR Nos. '255 and '256 Exhibit 2191).
Excelitas Technologies, "Avalanche Photodiode. A User Guide", 2011 Excelitas Technologies Corp., pp. 1-8.
Fast Company, The World's 50 Most Innovative Companies 2017, https://www.fastcompany.com/most-innovative-companies/2017 (last visited Feb. 26, 2018), 5 pages. (IPR Nos. '255 and '256 Exhibit 2077).
Fischer, "Rapid Measurement and Mapping of Tracer Gas Concentrations in a Large Indoor Space" (May 2000), 27 pages.
Ford Media Center, Ford Tripling Autonomous Vehicle Development Fleet, Accelerating on-road Testing of Sensors and Software (Jan. 5, 2016), 4 pages. (IPR Nos. '255 and '256 Exhibit 2066).
Fox, "Active electro-optical systems," The infrared and electro-optical systems handbook, vol. 6 (1993), pp. 1-80.
Frost et al., Driving the Future of Autonomous Navigation—Whitepaper for Analysis of LIDAR technology for advanced safety, https://velodynelidar.com/docs/papers/FROST-ON-LiDAR.pdf (2016), 30 pages. (IPR Nos. '255 and '256 Exhibit 1130).
Fuerstenberg, et al, Multilayer Laserscanner for Robust Object Tracking and Classification in Urban Traffic Scenes, 9th World Congress on Intelligent Transport Systems (2002), 14 pages. (IPR Nos. '255 and '256 Exhibit 1079), pp. 1-10.
Fuerstenberg, et al., Pedestrian Recognition and Tracking of Vehicles using a vehicle based Multilayer Laserscanner, IEEE (2002), 12 pages. (IPR Nos. '255 and '256 Exhibit 2192).
Fuerstenberg, Pedestrian detection and classification by laserscanners, (2003), 8 pages.
Furstenberg, et al., New Sensor for 360 Vehicle Surveillance—Innovative Approach to Stop & Go, Lane Assistance and Pedestrian Recognition (May 2001), 5 pages. (IPR Nos. '255 and '256 Exhibit 2190).
Gargiulo, Velodyne Lidar Tops Winning Urban Challenge Vehicles, Business Wire (Nov. 6, 2007), 2 pages. (IPR Nos. '255 and '256 Exhibit 2082).
Garmin, How the LIDAR-Lite v3/v3HP works with reflective surfaces, GARMIN.com, https://support.garmin.com/en-US/?faq=IVeHYIKwChAY0qCVhQiJ67 (last visited Aug. 24, 2018), 2 pages. (IPR Nos. '255 and '256 Exhibit 2145).
Glennie et al., Temporal Stability of the Velodyne HDL-64E S2 Scanner for High Accuracy Scanning Applications, MDPI Remote Sensing (Mar. 14, 2011), 15 pages. (IPR Nos. '255 and '256 Exhibit 2057).
Glennie, Performance analysis of a kinematic terrestrial LiDAR scanning system, MAPPS/ASPRS 2006 fall conference (Nov. 6-10, 2006), 9 pages.
Glennie, Reign of Point Clouds: A Kinematic Terrestrial LIDAR Scanning System (2007), pp. 22-31.
Gustavson, "Diode-laser radar for low-cost weapon guidance," SPIE vol. 1633, Laser radar VII (1992), pp. 1-12.
Hall, et al., Team DAD Technical Paper, DARPA Grand Challenge 2005, XP-002543336, Aug. 26, 2005, pp. 1-12. (IPR Nos. '255 and '256 Exhibit 1081).
Hamamatsu, CCD area image sensor S7030/S7031 Series Back-thinned FFT-CCD Datasheet (2006), 8 pages. (IPR Nos. '255 and '256 Exhibit 2123).
Hamamatsu, CCD Image Sensors Webpage ("CCD Image Sensors") (Feb. 2, 2006), 1 page. (IPR Nos. '255 and '256 Exhibit 2124).
Hamamatsu, Image Sensor Selection guide (Dec. 2003), 20 pages. (IPR Nos. '255 and '256 Exhibit 2128).
Hamamatsu, Image Sensors Webpage (Mar. 17, 2006), 1 page. (IPR Nos. '255 and '256 Exhibit 2160).
Hamamatsu, One-dimensional PSD Plastic package, 1-D PSD with plastic package Datasheet ("1-D PSD Datasheet") (2004), 5 pages. (IPR Nos. '255 and '256 Exhibit 2118).
Hamamatsu, One-Dimensional PSD Webpage, One-dimensional (Mar. 17, 2006), 1 page. (IPR Nos. '255 and '256 Exhibit 2119).

(56) References Cited

OTHER PUBLICATIONS

Hamamatsu, Photodiode Technical Information, 18 pages. (IPR Nos. '255 and '256 Exhibit 2129).
Hamamatsu, Position Sensitive Detectors ("PSDs") Webpage, One-dimensional and Two-dimensional (Mar. 17, 2006), 1 page. (IPR Nos. '255 and '256 Exhibit 2117).
Hamamatsu, S4111-46Q Si Photodiode Array Webpage (Oct. 22, 2005), 1 page. (IPR Nos. '255 and '256 Exhibit 2135).
Hamamatsu, Si photodiode array—S4111/S4114 series 16, 35, 46 element Si photodiode array for UV to NIR Datasheet (Jul. 2004), 4 pages. (IPR Nos. '255 and '256 Exhibit 2134).
Hamamatsu, Silicon Photodiode Array Webpage (Feb. 2, 2006), 1 page. (IPR Nos. '255 and '256 Exhibit 2130).
Hamamatsu, Technical Information, SD-25—Characteristics and use of FFT-CCD area image sensor (Aug. 2003), 27 pages. (IPR Nos. '255 and '256 Exhibit 2126).
Hamamatsu, Technical Information, SD-28—Characteristics and use of Si APD (Avalanche Photodiode) (Aug. 2001), 12 pages. (IPR Nos. '255 and '256 Exhibit 2127).
Hamamatsu, Two-dimensional PSD S1300 Datasheet (Dec. 19, 2005), 1 page. (IPR Nos. '255 and '256 Exhibit 2121).
Hamamatsu, Two-dimensional PSDs S1200, S1300, S1880, S1881, S2044—Non-discrete position sensor utilizing photodiode surface resistance Datasheet (2003), 6 pages. (IPR Nos. '255 and '256 Exhibit 2120).
Hamamatsu, Two-dimensional PSDs Webpage (Mar. 17, 2006), 1 page. (IPR Nos. '255 and '256 Exhibit 2122).
Hamatsu, Opto-Semiconductor Handbook, Si APD, MMPC (Chapter 3), ("APD Handbook"), available at https://www.hamamatsu.com/us/en/hamamatsu/overview/bsd/solid_state_division/related_documents.html (2014), 25 pages. (IPR Nos. '255 and '256 Exhibit 2006).
Hancock, "Laser Intensity Based Obstacle Detecting and Tracking" (Jan. 1999), pp. 45-65.
Haran et al., Infrared Reflectivy of Pedestrian Mannequin for Autonomous Emergency Braking Testing, IEEE 19th International Conference on Intelligent Transportation Systems (ITSC) (2016), 6 pages. (IPR Nos. '255 and '256 Exhibit 2168).
Heenan, et al., Feature-Level Map Building and Object Recognition for Intersection Safety Applications, in Advanced Microsystems for Automotive Applications (Jurgen Valldorf and Wolfgang Gessner eds.) (2005), pp. 505-519. (IPR Nos. '255 and '256 Exhibit 2199).
Hergert et al., The WITS$ guide to selecting a photodetector, Hamamatsu.com, https://hub.hamamatsu.com/us/en/technical-note/WITS-guide-detectorselection/index.html (Jul. 2015), 16 pages. (IPR Nos. '255 and '256 Exhibit 2133).
IBEO, "IBEO about," https://web.archive.org/web/20040606111631/http:/www.ibeoas.de:80/html/about/about (2004).
IBEO, "IBEO data and prices," https://web.archive.org/web/20041209025137/ http://www.ibeoas.de:80/html/prod/prod_dataprices.html (2004), 2 pages.
IBEO, "IBEO history," https://web.archive.org/web/20040807161657/, http://www.ibeoas.de:80/html/about/ab_history.html (2004), 1 page.
IBEO, "IBEO LD Multilayer data sheet," https://web.archive.org/web/20031003201743/ http://www.ibeoas.de:80/html/prod/prod_Id_multi.html (2003), 1 page.
IBEO, "IBEO Motiv sensor," https://web.archive.org/web/20040113062910/, http://www.ibeoas.de:80/html/rd/rd_rs_motiv.htm (1997-2000), 1 page.
IBEO, "IBEO multilayer tech" (2004), 1 page.
IBEO, "IBEO multitarget capability," https://web.archive.org/web/20040323030746/, http:/www.ibeoas.de:80/html/knho/knho-senstech-mlc.html (2004), 1 page.
IBEO, "IBEO products," https://web.archive.org/web/20040606115118/ http:/www.ibeoas.de:80/html/prod/prod.html (2004), 1 page.
IBEO, "IBEO products," https://web.archive.org/web/20041011011528/ http://www.ibeoas.de:80/html/prod/prod.html (2004), 1 page.
IBEO, "IBEO publications," https://web.archive.org/web/20031208175052/ http://www.ibeoas.de:80/html/public/public.html (2003), 2 pages.

IBEO, "IBEO roadmap," https://web.archive.org/web/20041209032449/http:/www.ibeoas.de:80/html/prod/prod_roadmap.html (2004), 1 page.
IBEO, "IBEO Time of Flight" (2004), 1 page.
IBEO, "IBEO," https://web.archive.org/web/20040202131331/http://www.ibeo-as.de:8 (2004), 1 page.
IBEO, IBEO about page, https://web.archive.org/web/20040606111631/http:/www.ibeoas.de:80/html/about/about (Jun. 6, 2004), 1 page. (IPR Nos. '255 and '256 Exhibit 1103).
IBEO, IBEO Alasca, https://web.archive.org/web/20031001091407/http:/www.ibeoas.de:80/html/prod/prod_alasca.html (Oct. 1, 2003), 1 page. (IPR Nos. '255 and '256 Exhibit 1099).
IBEO, IBEO Automobile Sensor GmbH—Scanner Technology webpage (Brennan Deposition Exhibit 1) (Mar. 23, 2004), 1 page. (IPR Nos. '255 and '256 Exhibit 2171).
IBEO, IBEO Automobile Sensor GmbH—The ALASCA project webpage (Brennan Deposition Exhibit 2) (Oct. 6, 2003), 1 page. (IPR Nos. '255 and '256 Exhibit 2172).
IBEO, IBEO Available products, https://web.archive.org/web/20041011011528/ http://www.ibeoas.de:80/html/prod/prod.html (Oct. 11, 2004), 1 page. (IPR Nos. '255 and '256 Exhibit 1108).
IBEO, IBEO data sheet re available products, https://web.archive.org/web/20041209025137/ http://www.ibeoas.de:80/html/prod/prod_dataprices.html (Dec. 9, 2004), 2 pages. (IPR Nos. '255 and '256 Exhibit 1107).
IBEO, IBEO history, https://web.archive.org/web/20040807161657/http:/www.ibeoas.de:80/html/about/ab_history.html (Aug. 7, 2004), 1 page. (IPR Nos. '255 and '256 Exhibit 1104).
IBEO, IBEO home page, https://web.archive.org/web/20040202131331/http:/www.ibeo-as.de:8 (Feb. 2, 2004), 1 page. (IPR Nos. '255 and '256 Exhibit 1102).
IBEO, IBEO LD Multilayer data sheet, https://web.archive.org/web/20031003201743/ http://www.ibeoas.de:80/html/prod/prod_Id_multi.html (Oct. 3, 2003), 1 page. (IPR Nos. '255 and '256 Exhibit 1111).
IBEO, IBEO Motiv sensor, https://web.archive.org/web/20040113062910/ http://www.ibeoas.de:80/html/rd/rd_rs_motiv.htm (Jan. 13, 2004), 1 page. (IPR Nos. '255 and '256 Exhibit 1110).
IBEO, IBEO multilayer tech, (Jan. 8, 2004), 1 page. (IPR Nos. '255 and '256 Exhibit 1097).
IBEO, IBEO multilayer technology page with moving graphic, Archive.org (Jan. 8, 2004), 1 page. (IPR Nos. '255 and '256 Exhibit 1096).
IBEO, IBEO multitarget capability, https://web.archive.org/web/20040323030746/ http:/www.ibeoas.de:80/html/knho/knho_senstech_mlc.html (Mar. 23, 2004), 1 page. (IPR Nos. '255 and '256 Exhibit 1101).
IBEO, IBEO products page, https://web.archive.org/web/20040606115118/ http:/www.ibeoas.de:80/html/prod/prod.html (Jun. 6, 2004), 1 page. (IPR Nos. '255 and '256 Exhibit 1100).
IBEO, IBEO publications page, https://web.archive.org/web/20031208175052/ http://www.ibeoas.de:80/html/public/public.html (Dec. 8, 2003), 2 pages. (IPR Nos. '255 and '256 Exhibit 1109).
IBEO, IBEO Roadmap, https://web.archive.org/web/20041209032449/http:/www.ibeoas.de:80/html/prod/prod_roadmap.html (Dec. 9, 2004), 1 page. (IPR Nos. '255 and '256 Exhibit 1105).
IBEO, IBEO time of flight with moving graphic, (Jan. 8, 2004), 1 page. (IPR Nos. '255 and '256 Exhibit 1095).
IBEO, IBEO Time of Flight, (Jan. 8, 2004), 1 page. (IPR Nos. '255 and '256 Exhibit 1098).
Informed Infrastructure, Velodyne LiDAR Division Announces Agreement with Caterpillar for Laser Imaging Technology, Informed Infrastructure http://informedinfrastructure.com/25630/velodynes-lidar-divisionannounces-agreement-with-caterpillar-for-laser-imaging-technology-2/ (Aug. 8, 2012), 3 pages. (IPR Nos. '255 and '256 Exhibit 2079).
Inter Parties Review Decision Denying Petitioner's Request for Rehearing (May 21, 2020), 26 pages. (IPR No. 2018-00255).
Inter Parties Review Decision: Institution of Inter Partes Review (May 25, 2018), 11 pages. (IPR No. 2018-00255).
Inter Parties Review Decision: Petitioner's Motion to Submit Supplemental Information Pursuant to 37 C.F.R. § 42.123(b) (Aug. 8, 2018), 4 pages. (IPR No. 2018-00255).
Inter Parties Review Declaration of Dr. James F. Brennan III (Nov. 29, 2017), 172 pages. (IPR Nos. '255 and '256 Exhibit 1002).

(56) References Cited

OTHER PUBLICATIONS

Inter Parties Review Final Written Decision (May 23, 2019), 40 pages. (IPR No. 2018-00255).
Inter Parties Review Patent Owner's Contingent Motion to Amend (Public Version—Redacted) (Sep. 28, 2018), 56 pages. (IPR No. 2018-00255).
Inter Parties Review Patent Owner's Preliminary Response (Public Version—Redacted) (Mar. 7, 2018), 72 pages. (IPR No. 2018-00255).
Inter Parties Review Patent Owner's Reply in Support of Its Contingent Motion to Amend (Jan. 16, 2019), 33 pages. (IPR No. 2018-00255).
Inter Parties Review Patent Owner's Response (Public Version—Redacted) (Sep. 28, 2018), 92 pages. (IPR No. 2018-00255).
Inter Parties Review Patent Owner's Surreply (Jan. 16, 2019), 50 pages. (IPR No. 2018-00255).
Inter Parties Review Patent Owner's Updated Exhibit List (Feb. 11, 2019), 21 pages. (IPR No. 2018-00255).
Inter Parties Review Petition for Inter Partes Review of U.S. Pat. No. 7,969,558 (Claims 1-4, 8, and 9) (IPR No. 2018-00255, *Quanergy Systems, Inc.* v. *Velodyne Lidar, Inc.*) (Nov. 29, 2017), 67 pages. (IPR No. 2018-00255).
Inter Parties Review Petitioner Quanergy's Opposition to Patent Owner's Contingent Motion to Amend (Dec. 21, 2018), 35 pages. (IPR No. 2018-00255).
Inter Parties Review Petitioner Quanergy's Sur-Surreply (Jan. 30, 2019), 9 pages. (IPR No. 2018-00255).
Inter Parties Review Petitioner Quanergy's Surreply to Patent Owner's Contingent Motion to Amend (Jan. 30, 2019), 17 pages. (IPR No. 2018-00255).
Inter Parties Review Petitioner's Motion to Submit Supplemental Information Pursuant to 37 C.F.R. § 42.123(b) (Aug. 6, 2018), 16 pages. (IPR No. 2018-00255).
Inter Parties Review Petitioner's Reply to Patent Owner's Response (Dec. 21, 2018), 38 pages. (IPR No. 2018-00255).
Inter Parties Review Petitioner's Request for Rehearing (Jun. 24, 2019), 20 pages. (IPR No. 2018-00255).
Inter Parties Review Petitioner's Unopposed Motion to Submit Replacement Petition and Supplemental Declaration (Nov. 5, 2018), 9 pages. (IPR No. 2018-00255).
Inter Parties Review Petitioner's Updated Exhibit List (Jan. 30, 2019), 13 pages. (IPR No. 2018-00255).
Inter Parties Review Record of Oral Hearing (Feb. 27, 2019), 126 pages. (IPR Nos. 2018-00255 and 2018-00256).
Inter Parties Review Replacement Petition for Inter Partes Review of U.S. Pat. No. 7,969,558 (Claims 1-4, 8, and 9), 71 pages. (IPR No. 2018-00255).
Inter Parties Review, Chris Butler Affidavit and Exhibit (Dec. 18, 2018), 33 pages. (IPR Nos. '255 and '256 Exhibit 1066).
Inter Parties Review, Chris Butler Affidavit and Exhibit (Dec. 20, 2018), 52 pages. (IPR Nos. '255 and '256 Exhibit 1067).
Inter Parties Review, Decision Denying Petitioner's Request for Rehearing (May 21, 2020), 26 pages. (IPR No. 2018-00256).
Inter Parties Review, Decision: Institution of Inter Partes Review (May 25, 2018), 12 pages. (IPR No. 2018-00256).
Inter Parties Review, Decision: Petitioner's Motion to Submit Supplemental Information Pursuant to 37 C.F.R. § 42.123(b) (Aug. 8, 2018), 4 pages. (IPR No. 2018-00256).
Inter Parties Review, Declaration of Dr. Sylvia Hall-Ellis (Nov. 29, 2017), 93 pages. (IPR Nos. '255 and '256 Exhibit 1041).
Inter Parties Review, Declaration of J. Gary Eden, Ph.D. in Support of Patent Owner's Preliminary Responses (Public Version—Redacted) (Mar. 7, 2018), 120 pages. (IPR Nos. '255 and '256 Exhibit 2003).
Inter Parties Review, Declaration of J. Gary Eden, Ph.D. in Support of Patent Owner's Reply in Support of Its Motion to Amend (Jan. 16, 2019), 71 pages. (IPR Nos. '255 and '256 Exhibit 2202).

Inter Parties Review, Declaration of J. Gary Eden, Ph.D. in Support of Patent Owner's Responses and Motions to Amend (Public Version—Redacted) (Sep. 27, 2018), 202 pages. (IPR Nos. '255 and '256 Exhibit 2115).
Inter Parties Review, Declaration of James F. Brennan, III in Support of Petitioner's Replies and Oppositions to Motions to Amend (Dec. 21, 2018), 93 pages. (IPR Nos. '255 and '256 Exhibit 1063).
Inter Parties Review, Declaration of Sylvia Hall-Ellis (Dec. 21, 2018), 146 pages. (IPR Nos. '255 and '256 Exhibit 1065).
Inter Parties Review, Defendant Velodyne's Answer and Counterclaim, *Quanergy Systems, Inc.*, v. *Velodyne Lidar, Inc.*, No. 5:16-cv-05251-EJD (N.D. Cal.) ECF No. 36 (Dec. 5, 2016), 56 pages. (IPR Nos. '255 and '256 Exhibit 2080).
Inter Parties Review, Deposition of James F. Brennan, III, *Quanergy Systems, Inc.* v. *Velodyne Lidar, Inc.*, Nos. IPR2018-00255 and IPR2018-00256 (Aug. 23, 2018), 241 pages. (IPR Nos. '255 and '256 Exhibit 2156).
Inter Parties Review, Deposition of James F. Brennan, III, *Quanergy Systems, Inc.* v. *Velodyne Lidar, Inc.*, Nos. IPR2018-00255 and IPR2018-00256 (Jan. 4, 2019), 267 pages. (IPR Nos. '255 and '256 Exhibit 2194).
Inter Parties Review, Deposition Transcript of J. Gary Eden, Ph.D (taken Nov. 27, 2018), 285 pages. (IPR Nos. '255 and '256 Exhibit 1064).
Inter Parties Review, Deposition Transcript of J. Gary Eden, Ph.D (taken on Jan. 22, 2019), 368 pages. (IPR Nos. '255 and '256 Exhibit 1150).
Inter Parties Review, Eden Deposition Exhibit 1—Unmanned Vehicles Come of Age: The DARPA Grand Challenge (2006), pp. 26-29. (IPR Nos. '255 and '256 Exhibit 1151).
Inter Parties Review, Eden Deposition Exhibit 10—Are processor algorithms key to safe self-driving cars?—EDN Asia (https://www.ednasia.com/news/article/areprocessor-algorithms-key-to-safe-self-driving-cars) (Jul. 7, 2016), 7 pages. (IPR Nos. '255 and '256 Exhibit 1160).
Inter Parties Review, Eden Deposition Exhibit 11—Steve Taranovich's profile (https://www.edn.com/user/steve.taranovich) (Jan. 22, 2019), 4 pages. (IPR Nos. '255 and '256 Exhibit 1161).
Inter Parties Review, Eden Deposition Exhibit 12—Instrumentation and Control (http://www.Instrumentation.co.za/article.aspx?pklarticleid=1664) (Feb. 2002), 4 pages. (IPR Nos. '255 and '256 Exhibit 1162).
Inter Parties Review, Eden Deposition Exhibit 13—IBEO on board: IBEO LUX 4L / ibeo LUX 8L / ibeo LUX HD Data Sheet (Jul. 2017), 2 pages. (IPR Nos. '255 and '256 Exhibit 1163).
Inter Parties Review, Eden Deposition Exhibit 2—Driver Reaction Time in Crash Avoidance Research: validation of a Driving Simulator Study on a Test Track; Article in Human Factors and Ergonomics Society Annual Meeting Proceedings, Jul. 2000, 5 pages. (IPR Nos. '255 and '256 Exhibit 1152).
Inter Parties Review, Eden Deposition Exhibit 3—Axis of Rotation diagram (Jan. 22, 2019), 1 page. (IPR Nos. '255 and '256 Exhibit 1153).
Inter Parties Review, Eden Deposition Exhibit 4—Parallel Line and Plane—from Wolfram MathWorld (http://mathworld.wolfram.com/ParallelLineandPlane.html) (Jan. 22, 2019), 1 page. (IPR Nos. '255 and '256 Exhibit 1154).
Inter Parties Review, Eden Deposition Exhibit 5—Quasi-3D Scanning with Laserscanners: Introduction from 2D to 3D (2001), 7 pages. (IPR Nos. '255 and '256 Exhibit 1155).
Inter Parties Review, Eden Deposition Exhibit 6—L-Gage LT3 Long-Range Time-of-Flight Laser Distance-Gauging Sensors (2002), 12 pages. (IPR Nos. '255 and '256 Exhibit 1156).
Inter Parties Review, Eden Deposition Exhibit 7—About Ibeo: Our Mission (https://www.ibeoas.com/aboutibeo) (Jan. 21, 2019), 10 pages. (IPR Nos. '255 and '256 Exhibit 1157).
Inter Parties Review, Eden Deposition Exhibit 8—Automotive Industry; Explore Our Key Industries (https://velodynelidar.com/industry.html) (2019), 6 pages. (IPR Nos. '255 and '256 Exhibit 1158).

(56) References Cited

OTHER PUBLICATIONS

Inter Parties Review, Eden Deposition Exhibit 9—Leddar Tech, Solid-State LiDARs: Enabling the Automotive Industry Towards Autonomous Driving (2018), 6 pages. (IPR Nos. '255 and '256 Exhibit 1159).
Inter Parties Review, Excerpt from Beautiful Data, Edited by Toby Segaran and Jeff Hammerbacher (Jul. 2009), pp. 150-153. (IPR Nos. '255 and '256 Exhibit 2014).
Inter Parties Review, Excerpt from James T. Luxon and David E. Parker, Industrial Lasers and Their Applications, Prentice-Hall (1985), pp. 56, 68-70, 124-125, 145, 150-151, and 154-159. (IPR Nos. '255 and '256 Exhibit 2009).
Inter Parties Review, Excerpt from Peter W. Milonni and Joseph Eberly, Lasers (1988), pp. 585-589. (IPR Nos. '255 and '256 Exhibit 2011).
Inter Parties Review, Excerpt from Raymond T. Measures, Laser Remote Sensing, Fundamentals and Applications (1992), pp. 205 and 213-214. (IPR Nos. '255 and '256 Exhibit 2010).
Inter Parties Review, Excerpt from Stephan Lugomer, Laser Technology, Laser Driven Processes, Prentice-Hall (1990), pp. 302-311. (IPR Nos. '255 and '256 Exhibit 2008).
Inter Parties Review, Excerpt from William V. Smith, Laser Applications (1970), pp. 23-27. (IPR Nos. '255 and '256 Exhibit 2012).
Inter Parties Review, Excerpts of Deposition of Craig L. Glennie, Ph.D., *Quanergy Systems, Inc.*, v. *Velodyne Lidar, Inc.*, No. 5:16-cv-05251-EJD (N.D. Cal.) (Jun. 27, 2017), 6 pages. (IPR Nos. '255 and '256 Exhibit 2016).
Inter Parties Review, Final Written Decision (May 23, 2019), 41 pages. (IPR No. 2018-00256).
Inter Parties Review, Images of Generator Rotors (Brennan Deposition Exhibit 8) (2018), 2 pages. (IPR Nos. '255 and '256 Exhibit 2178).
Inter Parties Review, Listing of Labelled Substitute Claims (2018), 17 pages. (IPR Nos. '255 and '256 Exhibit 1076).
Inter Parties Review, Patent Owner's Contingent Motion to Amend (Public Version—Redacted) (Sep. 28, 2018), 57 pages. (IPR No. 2018-00256).
Inter Parties Review, Patent Owner's Preliminary Response (Public Version—Redacted) (Mar. 7, 2018), 73 pages. (IPR No. 2018-00256).
Inter Parties Review, Patent Owner's Reply in Support of Its Contingent Motion to Amend (Jan. 16, 2019), 33 pages. (IPR No. 2018-00256).
Inter Parties Review, Patent Owner's Response (Public Version—Redacted) (Sep. 28, 2018), 92 pages. (IPR No. 2018-00256).
Inter Parties Review, Patent Owner's Surreply (Jan. 16, 2019), 50 pages. (IPR No. 2018-00256).
Inter Parties Review, Patent Owner's Updated Exhibit List (Feb. 11, 2019), 20 pages. (IPR No. 2018-00256).
Inter Parties Review, Petition for Inter Partes Review of U.S. Pat. No. 7,969,558 (Claims 16-19 and 23-25) (IPR No. 2018-00256, *Quanergy Systems, Inc.* v. *Velodyne Lidar, Inc.*) (Nov. 29, 2017), 73 pages. (IPR No. 2018-00256).
Inter Parties Review, Petitioner Quanergy's Opposition to Patent Owner's Contingent Motion to Amend (Dec. 21, 2018), 35 pages. (IPR No. 2018-00256).
Inter Parties Review, Petitioner Quanergy's Sur-Surreply (Jan. 30, 2019), 9 pages. (IPR No. 2018-00256).
Inter Parties Review, Petitioner Quanergy's Surreply to Patent Owner's Contingent Motion to Amend (Jan. 30, 2019), 17 pages. (IPR No. 2018-00256).
Inter Parties Review, Petitioner's Motion to Submit Supplemental Information Pursuant to 37 C.F.R. § 42.123(b) (Aug. 6, 2018), 16 pages. (IPR No. 2018-00256).
Inter Parties Review, Petitioner's Reply to Patent Owner's Response (Dec. 21, 2018), 37 pages. (IPR No. 2018-00256).
Inter Parties Review, Petitioner's Request for Rehearing (Jun. 24, 2019), 20 pages. (IPR No. 2018-00256).

Inter Parties Review, Petitioner's Unopposed Motion to Submit Replacement Petition and Supplemental Declaration (Nov. 5, 2018), 9 pages. (IPR No. 2018-00256).
Inter Parties Review, Petitioner's Updated Exhibit List (Jan. 30, 2019), 15 pages. (IPR No. 2018-00256).
Inter Parties Review, Ptab Conference Call, *Quanergy Systems, Inc.* v. *Velodyne Lidar, Inc.*, Nos. IPR2018-00255 and 2018-00256 (Jan. 11, 2019), 27 pages. (IPR Nos. '255 and '256 Exhibit 2204).
Inter Parties Review, Quanergy Invalidity Contentions Claim Chart, U.S. Pat. No. 7,969,558 (Mizuno), *Quanergy Systems, Inc.* v. *Velodyne LIDAR, Inc.*, Case No. 5:16-cv-5251-EJD (Mar. 27, 2017), 17 pages. (IPR Nos. '255 and '256 Exhibit 1127).
Inter Parties Review, Quanergy Invalidity Contentions Claim Chart, U.S. Pat. No. 7,969,558 (PILAR), *Quanergy Systems, Inc.* v. *Velodyne LiDAR, Inc.*, Case No. 5:16-cv-5251-EJD (Mar. 27, 2017), 13 pages. (IPR Nos. '255 and '256 Exhibit 1128).
Inter Parties Review, Quanergy M8 Lidar Sensor Datasheet, 2 pages. (IPR Nos. '255 and '256 Exhibit 2071).
Inter Parties Review, Quanergy Systems Inc.'s Invalidity Contentions and Production of Documents Pursuant to Patent Local Rules 3-3 and 3-4, *Quanergy Systems, Inc.* v. *Velodyne LiDAR, Inc.*, Case No. 5:16-cv-5251-EJD (Mar. 27, 2017), 24 pages. (IPR Nos. '255 and '256 Exhibit 1126).
Inter Parties Review, Quanergy's Objected-to Demonstrative Slides of Patent Owner (2019), 16 pages. (IPR Nos. '255 and '256 Exhibit 1164).
Inter Parties Review, Redlined Supplemental Declaration of Dr. James F. Brennan III (2018), 171 pages. (IPR Nos. '255 and '256 Exhibit 1062).
Inter Parties Review, Replacement Petition for Inter Partes Review of U.S. Pat. No. 7,969,558 (Claims 16-19 and 23-25) (2018) 76 pages. (IPR No. 2018-00256).
Inter Parties Review, Transcript of Sep. 13, 2018 Conference Call, *Quanergy Systems, Inc.* v. *Velodyne Lidar, Inc.*, Nos. IPR2018-00255 and IPR2018-00256 (Sep. 13, 2018), 21 pages. (IPR Nos. '255 and '256 Exhibit 2116).
International Electrotechnical Commission, "Safety of laser products—part 1: equipment classification and requirements," International Standard IEC 60825-1, edition 1.2 (Aug. 2001), 122 pages.
International Electrotechnical Commission, "Safety of laser products—part 1: equipment classification and requirements," International Standard IEC 60825-1, edition 2.0 (2007), 104 pages.
Internet Archive Web Page: Laser Components (2004), 1 page. (IPR Nos. '255 and '256 Exhibit 1023).
Internet Archive Web Page: Laser Components: High Powered Pulsed Laser Diodes 905D3J08-Series (2004), 6 pages. (IPR Nos. '255 and '256 Exhibit 1024).
Internet Archive Webpage: Mercotac 3-Conductor Rotary Electrical Connectors (Mar. 2006), 1 page. (IPR Nos. '255 and '256 Exhibit 1031).
IPO Education Foundation, Inventor of the Year Award, https://www.ipoef.org/inventor-of-the-year/ (2018), 5 pages. (IPR Nos. '255 and '256 Exhibit 2207).
IRDAJP.org, IrDA Infrared Data Association, http://www.irdajp.org/irdajp.info (2018), 3 pages. (IPR Nos. '255 and '256 Exhibit 1134).
Janocha, Actuators: Basics and Applications, Springer (2004), pp. 85-153. (IPR Nos. '255 and '256 Exhibit 1080).
Japanese Patent Office, Petitioner's Translation of Mizuno Japanese Patent Publication No. H3-6407 (1991), 15 pages. (IPR Nos. '255 and '256 Exhibit 1058).
Jelalian, "Laser Radar Systems" (1992), 1 page.
Juberts, et al., "Status report on next generation LADAR for driving unmanned ground vehicles" Mobile Robots XVII, edited by Douglas W. Gage, Proceedings of SPIE, vol. 5609, 2004, pp. 1-12.
Kaempchen, Feature-Level Fusion of Laser Scanner and Video Data for Advanced Drive Assistance Systems (Ph.D. Dissertation, Ulm University) (2007), 248 pages. (IPR Nos. '255 and '256 Exhibit 2198).
Kaufmann, Choosing Your Detector, OE Magazine (Mar. 2005), 3 pages. (IPR Nos. '255 and '256 Exhibit 2150).
Kaufmann, Light Levels and Noise—Guide Detector Choices, Photonics Spectra 149 (Jul. 2000), 4 pages. (IPR Nos. '255 and '256 Exhibit 2151).

(56) References Cited

OTHER PUBLICATIONS

Kawata, "Development of ultra-small lightweight optical range sensor system", 2005 IEEE/RSJ International Conference on Intelligent Robots and Systems, Edmonton, AB, Canada, Aug. 2-6, 2005, pp. 58-63 (IPR Nos. '255 and '256 Exhibit 1033).

Kilpela, Excerpt of Pulsed Time-of-Flight Laser Range Finder Techniques for Fast, High Precision Measurement Applications, at Fig. 24 (Academic dissertation, University of Oulu (Brennan Deposition Exhibit 15) (2004), 1 page. (IPR Nos. '255 and '256 Exhibit 2185).

Kilpela, Pulsed Time-of-Flight Laser Range Finder Techniques for Fast, High Precision Measurement Applications (Academic dissertation, University of Oulu) (2004), 98 pages. (IPR Nos. '255 and '256 Exhibit 2152).

Kilpelä, "Precise pulsed time-of-flight laser range finder for industrial distance measurements," Review of Scientific Instruments (Apr. 2001), 13 pages. (IPR Nos. '255 and '256 Exhibit 1005).

Kluge, Laserscanner for Automotive Applications (May 2001), 5 pages. (IPR Nos. '255 and '256 Exhibit 2196).

Kohanbash, "LIDAR fundamentals—robots for roboticists" (May 5, 2014), 6 pages.

Lages, Laserscanner for Obstacle Detection in Advanced Microsystems for Automotive Applications Yearbook (S. Kruger et al. eds.) (2002), pp. 136-140. (IPR Nos. '255 and '256 Exhibit 2200).

Lamon, "The SmarTer for ELROB 2006—a vehicle for fully autonomous navigation and mapping in outdoor environments" (2005), 14 pages.

Langheim, et al., Sensing of Car Environment at Low Speed Driving, CARSENSE (2002), 14 pages. (IPR Nos. '255 and '256 Exhibit 2193).

Laser Components Produkte, Laser Components IG, Inc., 2004, 1 page.

Laser Components, "High Power Pulsed Laser Diodes 905D3J08-Series", Laser Components IG, Inc., 2004, 6 pages.

Laser Components, https:/web.archive.org/web/20041205172904/http:www.lasercomponents.com (2004), 1 page. (IPR Nos. '255 and '256 Exhibit 1023).

Liu, et al., "Coupling Study of a Rotary Capacitive Power Transfer System" Industrial Technology, 2009. ICIT 2009. IEEE International Conference, IEEE, Piscataway, NJ, USA, Feb. 10, 2009, pp. 1-6.

Maatta et al., A High-Precision Time-to-Digital Converter for Pulsed Time-of-Flight Laser Radar Applications, 47 IEEE No. 2, 521 (Apr. 1998), pp. 521-536. (IPR Nos. '255 and '256 Exhibit 2161).

Macadam, Understanding and Modeling the Human Driver, 40 Vehicle System Dynamics, Nos. 1-3 (2003), pp. 101-134. (IPR Nos. '255 and '256 Exhibit 2205).

Makynen, Position-Sensitive Devices and Sensor System for Optical Tracking and Displacement Sensing Applications (Academic Dissertation, University of Oulu (2000), 121 pages. (IPR Nos. '255 and '256 Exhibit 2153).

Manandhar, "Auto-Extraction of Urban Features from Vehicle-Borne Laser Data", Centre for Spatial Information Science, The University of Tokyo, Japan; Symposium on Geospatial Theory, Processing Applications, Ottawa (2002) 6 pages. (IPR Nos. '255 and '256 Exhibit 1017).

Marino, "A compact 3D imaging laser RADAR system using Geiger-mode APD arrays: system and measurements," Proceedings of SPIE—The international society for optical engineering (Aug. 2003), 16 pages.

Marino, "Jigsaw: A Foliage-Penetrating 3D Imaging Laser Radar System" (2005), pp. 23-36.

McManamon, "Optical Phased Array Technology," Proceedings of the IEEE, vol. 84, No. 2 (Feb. 1996), pp. 268-298.

Melle, et al., "How to select avalanche photodiodes," Laser Focus World (Oct. 1, 1995), 9 pages. (IPR Nos. '255 and '256 Exhibit 1020).

MERCOTAC Model 305, Electrical Slip Rings, https://web.archive.org/web/20060210065219/www.mercotac.com/html/305.htm (Feb. 2006), 3 pages.

MERCOTAC, 3-Conductor Rotary Electrical Connectors https://web.archive.org/web/20060317120209/http://www.mercotac.com:80/html/threeconductor.html (Mar. 2006), 1 page.

Merriam, How to Use Lidar with the raspberry PI, Hackaday, https://hackaday.com/2016/01/22/how-to-use-lidar-with-the-raspberry-pi/ (Jan. 22, 2016), 13 pages. (IPR Nos. '255 and '256 Exhibit 1072).

Morsy et al., "Multispectral LiDAR Data for Land Cover Classification of Urban Areas," Sensors 17(5), 958 (2017), 21 pages.

MTI Instruments Inc., An Introduction to Laser Triangulation Sensors, https://www.azosensors.com/article.aspx?ArticleID=523 (Aug. 28, 2014), 9 pages. (IPR Nos. '255 and '256 Exhibit 2154).

Nagappan, "Adaptive Cruise Control: Laser Diodes as an Alternative to Millimeter Wave Radars" (Sep. 2005), pp. 1-5.

National Highway Traffic Safety Administration (NHTSA), Dot, Final Rule Federal Motor Vehicle Safety Standards; Tire Pressure Monitoring Systems Controls and Displays (2005), 222 pages. (IPR Nos. '255 and '256 Exhibit 1141).

Office of the Federal Register National Archives and Records Administration, "Code of Federal Regulations, 21, Parts 800 to 1299, Revised as of Apr. 1, 2005, Food and Drugs", Apr. 1, 2005, pp. 1-23.

Ogurtsov, et al., "High Accuracy ranging with Yb3+-doped fiber-ring frequency-shifted feedback laser with phase-modulated seed," Optics Communications (2006), pp. 266-273. (IPR Nos. '255 and '256 Exhibit 1042).

Ohnsman, How A 34-Year-Old Audio Equipment Company is Leading the Self-Driving Car Revolution, Forbes (Aug. 8, 2017), 7 pages. (IPR Nos. '255 and '256 Exhibit 2040).

Ohr, "War raises stakes of next DARPA bot race," EDN (Aug. 15, 2005), 3 pages.

OMRON, Technical Explanation for Displacement Sensors and Measurement Sensors, CSM_Displacemente_LineWidth_TG_E_2_1 (2018), 8 pages. (IPR Nos. '255 and '256 Exhibit 2149).

Oshkosh, "Team Terramax: DARPA Grand Challenge 2005" (Oct. 2005), pp. 1-14.

Ou-Yang, et al., "High-dynamic-range laser range finders based on a novel multimodulated frequency method," Optical Engineering (Dec. 2006), 6 pages. (IPR Nos. '255 and '256 Exhibit 1043).

Overton, First Sensor expands supply agreement for APDs used in Velodyne lidar systems, Laser Focus World (Feb. 15, 2017), 2 pages. (IPR Nos. '255 and '256 Exhibit 2039).

Ozguner, "Team TerraMax and the DARPA Grand Challenge: a General Overview," IEEE Intelligent Vehicles Symposium (2004), 6 pages.

Panasonic, Measurement Sensors: Specular vs Diffuse, Panasonic Blog, https://na.industrial.panasonic.com/blog/measurement-sensorsspecular-vs-diffuse (Dec. 7, 2011), 2 pages. (IPR Nos. '255 and '256 Exhibit 2155).

PCT International Search Report and Written Opinion, App. No. PCT/US2007/073490, (dated 2008), 10 pages.

PCT International Search Report and Written Opinion, App. No. PCT/US2010/037129, dated Jul. 27, 2010, 6 pages.

PCT International Search Report and Written Opinion, App. No. PCT/US2017/015869, dated Apr. 10, 2017, 12 pages.

PCT International Search Report and Written Opinion, App. No. PCT/US2017/015874, dated May 23, 2017, 12 pages.

PCT International Search Report and Written Opinion, App. No. PCT/US2017/015877, dated Apr. 13, 2017, 13 pages.

PCT International Search Report and Written Opinion, App. No. PCT/US2017/023259, dated May 31, 2017, 10 pages.

PCT International Search Report and Written Opinion, App. No. PCT/US2017/023261, dated May 26, 2017, 11 pages.

PCT International Search Report and Written Opinion, App. No. PCT/US2017/023262, dated Jun. 5, 2017, 9 pages.

PCT International Search Report and Written Opinion, App. No. PCT/US2017/035427, dated Aug. 29, 2017, 10 pages.

PCT International Search Report and Written Opinion, App. No. PCT/US2017/036865, dated Sep. 26, 2017, 10 pages.

(56) References Cited

OTHER PUBLICATIONS

PCT International Search Report and Written Opinion, App. No. PCT/US2017/047543, dated Nov. 27, 2017, 11 pages.
PCT International Search Report and Written Opinion, App. No. PCT/US2018/023283, dated Jun. 1, 2018, 9 pages.
PCT International Search Report and Written Opinion, App. No. PCT/US2018/025395, dated Jun. 25, 2018, 14 pages.
PCT International Search Report and Written Opinion, App. No. PCT/US2018/031682, dated Sep. 17, 2018, 12 pages.
PCT International Search Report and Written Opinion, App. No. PCT/US2018/050934, dated Nov. 20, 2018, 10 pages.
PCT International Search Report and Written Opinion, App. No. PCT/US2018/051497, dated Nov. 28, 2018, 11 pages.
PCT International Search Report and Written Opinion, App. No. PCT/US2018/059062, dated Jan. 16, 2019, 6 pages.
PCT International Search Report and Written Opinion, App. No. PCT/US2018/059452, dated Jan. 16, 2019, 12 pages.
PCT International Search Report and Written Opinion, App. No. PCT/US2019/016259, dated Apr. 26, 2019, 6 pages.
PCT International Search Report and Written Opinion, App. No. PCT/US2019/046412, dated Jun. 24, 2020, 10 pages.
PCT International Search Report and Written Opinion, App. No. PCT/US2019/046419, dated Oct. 29, 2019, 14 pages.
PCT International Search Report and Written Opinion, App. No. PCT/US2019/046422, dated Dec. 3, 2019, 9 pages.
PCT International Search Report and Written Opinion, App. No. PCT/US2019/046573, dated Nov. 15, 2019, 9 pages.
PCT International Search Report and Written Opinion, App. No. PCT/US2019/051729, dated Nov. 20, 2019, 7 pages.
PCT Search Report and Written Opinion (Corrected), App. No. PCT/US2020/026925, dated May 12, 2020, 5 pages.
PCT Search Report and Written Opinion, App. No. PCT/US2020/012633, dated Jun. 2, 2020, 13 pages.
PCT Search Report and Written Opinion, App. No. PCT/US2020/012635, dated Jun. 4, 2020, 10 pages.
Piatek et al., LiDAR: A photonics guide to autonomous vehicle market, Hamamatsu.com, https://hub.hamamatsu.com/us/en/application-note/LiDAR-competingtechnologies-automotive/index.html (Nov. 18, 2017), 6 pages. (IPR Nos. '255 and '256 Exhibit 2136).
Piatek, Measuring distance with light, Hamamatsu.com, https://hub.hamamatsu.com/us/en/application-note/measuringdistance-with-light/index.html (Apr. 2, 2015), 18 pages. (IPR Nos. '255 and '256 Exhibit 2132).
Piatek, Presentation entitled 'LiDAR and Other Techniques—Measuring Distance with Light for Automotive Industry', authored by Slawomir Piatek, Technical Consultant, Hamamatsu Corp. (Dec. 6, 2017), 66 pages. (IPR Nos. '255 and '256 Exhibit 2131).
Popper, Guiding Light, The Billion-Dollar Widget Steering the Driverless Car Industry, The Verge (Oct. 18, 2017), 17 pages. (IPR Nos. '255 and '256 Exhibit 2076).
Qing, "Method of 3D visualization using laser radar on board of mobile robot," Journal of Jilin University (Information Science Ed.), vol. 22 (Jul. 2004), 4 pages.
Quanergy Systems, Inc. v. Velodyne LiDAR, Inc. (N.D. Cal.), Case No. 5:16-cv-05251, "Plaintiff Quanergy Systems, Inc.'s Amended Invalidity Contentions Pursuant to Patent Local Rule 3-3," May 23, 2017, 238 pages.
Quanergy Systems, Inc. v. Velodyne LiDAR, Inc. (N.D. Cal.), Case No. 5:16-cv-05251, "Plaintiff Quanergy Systems, Inc.'s Invalidity Contentions and Production of Documents Pursuant to Patent Local Rules 3-3 and 3-4," Mar. 27, 2017, 24 pages.
Quanergy Systems, Inc. v. Velodyne LiDAR, Inc. (N.D. Cal.), Case No. 5:16-cv-05251, Amended Complaint, Nov. 18, 2016, 6 pages.
Quanergy Systems, Inc. v. Velodyne LiDAR, Inc. (N.D. Cal.), Case No. 5:16-cv-05251, Answer to Counterclaim, (Jan. 16, 2017) 9 pages.
Quanergy Systems, Inc. v. Velodyne LiDAR, Inc. (N.D. Cal.), Case No. 5:16-cv-05251, Defendant Velodyne's Answer and Counterclaim, Dec. 5, 2016, 20 pages.
Quanergy Systems, Inc. v. Velodyne LiDAR, Inc. (N.D. Cal.), Complaint, Case No. 5:16-cv-05251 (Sep. 13, 2016), 21 pages.
Ramsey et al., Use Scenarios to Plan for Autonomous Vehicle Adoption, Gartner (Jun. 26, 2017), 17 pages. (IPR Nos. '255 and '256 Exhibit 2064).
Reutebuch, "LiDAR: an Emerging Tool for Multiple Resource Inventory," Journal of Forestry (Sep. 2005) 7 pages.
Reymann et al., Improving LiDAR Point Cloud Classification using Intensities and Multiple Echoes, IEE/RSJ International Conference on Intelligent Robots and Systems (Sep. 2015), 8 pages. (IPR Nos. '255 and '256 Exhibit 2167).
Richmond et al., Polarimetric Imaging Laser Radar (PILAR) Program. In Advanced Sensory Payloads for UAV, Meeting Proceedings RTO-MP-SET-092, Paper 19. Neuilly-sur-Seine, France: RTO (May 1, 2005), 35 pages. (IPR Nos. '255 and '256 Exhibit 1129).
Riegl LMS-Q120, http://web.archive.org/web/20050113054822/ http://www.riegl.com/industrial_scanners_/lms_q120_/q120_all_.htm (2005), 4 pages.
Riegl, "Riegl LMS-Z210" (2003), 8 pages.
Robots for Roboticists, LiDAR Fundamentals, http://robotsforroboticists.com/lidar-fundamentals/ (May 5, 2014), 6 pages. (IPR Nos. '255 and '256 Exhibit 1068).
ROS-DRIVERS—Error in packet rate for the VLP-32C #142, GitHub Forum (Jan. 29, 2018), 1 page. (IPR Nos. '255 and '256 Exhibit 2041).
Saleh, "Fundamentals of Photonics" vol. 2, Wiley-Interscience Publication, 1991, pp. 342-383, 494-541, and 592-695. (IPR Nos. '255 and '256 Exhibit 1008).
Search Report and Opinion, EP App. No. 07840406.8, dated Sep. 8, 2009, 6 pages.
Search Report and Opinion, EP App. No. 11166432.2, dated Jul. 28, 2011, 7 pages.
Search Report and Opinion, EP App. No. 17745112.7, dated Aug. 27, 2019, 8 pages.
Search Report and Opinion, EP App. No. 17770748.6, dated Oct. 22, 2019, 10 pages.
Search Report and Opinion, EP App. No. 17770926.8, dated Oct. 29, 2019, 11 pages.
Search Report and Opinion, EP App. No. 17770928.4, dated Oct. 29, 2019, 10 pages.
Search Report and Opinion, EP App. No. 17807474.6, dated Dec. 9, 2019, 9 pages.
Sensick, "Dme 2000 / DME 3000: Precise non-contact distance determination," Sensick Catalogue (2006), pp. 450-457. (IPR Nos. '255 and '256 Exhibit 1073).
Sick DME 2000 Operating Instructions (Excerpt) (Brennan Deposition Exhibit 9) (May 2002), 42 pages. (IPR Nos. '255 and '256 Exhibit 2179).
SICK Laser Triangulation Sensors Product Information (Brennan Deposition Exhibit 6) (Jun. 25, 2018), 76 pages. (IPR Nos. '255 and '256 Exhibit 2176).
Sick LMS 200/ LMS 211/ LMS 220 / LMS 221/ LMS 291 Laser Measurement Systems—Technical Description (Brennan Deposition Exhibit 4) (Jun. 2003), 40 pages. (IPR Nos. '255 and '256 Exhibit 2174).
Sick LMS200/211/221/291 Laser Measurement Systems—Technical Description (Brennan Deposition Exhibit 3) (2006), 48 pages. (IPR Nos. '255 and '256 Exhibit 2173).
SICK Sensick Measuring Distance with Light—Distance Sensors Product Overview (Brennan Deposition Exhibit 10) (2004), 12 pages. (IPR Nos. '255 and '256 Exhibit 2180).
SICK, SICK ToF sensors at close range, https://web.archive.org/web/20040607070720/ http://www.sick.de:80/de/products/categories/industrial/distancesensors/dme2000/en.html (Jun. 7, 2004), 2 pages. (IPR Nos. '255 and '256 Exhibit 1082).
Singh, "Cyclone: A Laser Scanner for Mobile Robot Navigation" (Sep. 1991), pp. 1-18.
Skolnik, "Introduction to radar systems," Second edition, McGraw-Hill book company (1980), pp. 1-3.
Skolnik, "Radar Handbook" Second Edition, McGraw-Hill Publishing Company, 1990, pp. 1-1191.

(56) References Cited

OTHER PUBLICATIONS

Song et al., Assessing the Possibility of Land-Cover Classification Using LiDAR Intensity Data, Commission Iii, PCV02 (2002), 4 pages. (IPR Nos. '255 and '256 Exhibit 2169).
Spies, "Extended Eyes - Sense and Avoid," Presented at the 2006 International Aerospace Exhibition, Berlin (May 2006), 22 pages.
Stone, "Performance analysis of next-generation LADAR for manufacturing, construction, and mobility" (May 2004), 198 pages.
Strang, Drawing of cross-section of I-beam by Jonathan Strang (Brennan Deposition Exhibit 5), (2018) 1 page. (IPR Nos. '255 and '256 Exhibit 2175).
strata-gee.com, Velodyne President Calls Strata-gee to Set the Record Straight, https://www.strata-gee.com/velodyne-president-calls-strata-gee-setrecord-straight/ (Jun. 26, 2014), 6 pages. (IPR Nos. '255 and '256 Exhibit 1137).
Strawa et al., The Measurement of Aerosol Optical Properties Using Continuous Wave Cavity Ring-Down Techniques, 20 Journal of Atmospheric and Oceanic Technology 454 (Apr. 2003), pp. 454-465. (IPR Nos. '255 and '256 Exhibit 2090).
Tarakanov, et al., "Picosecond pulse generation by internal gain switching in laser diodes," Journal of Applied Physics 95:223 (Mar. 2004), pp. 2223-2229. (IPR Nos. '255 and '256 Exhibit 1044).
Taranovich, Are processor algorithms key to safe self-driving cars? EDN ASIA, https://www.ednasia.com/news/article/are-processor-algorithms-key-tosafe-self-driving-cars (Jul. 7, 2016), 11 pages. (IPR Nos. '255 and '256 Exhibit 2206).
Taylor, An Introduction to Error Analysis—The Study of Uncertainties in Physical Measurements, Oxford University Press (1982), pp. 81-137. (IPR Nos. '255 and '256 Exhibit 1138).
The American Heritage Dictionary of the English Language, Houghton Mifflin Company, 3d ed. (1996), pp. 1497, 1570, 1697, 1762, and 1804. (IPR Nos. '255 and '256 Exhibit 1018).
The American Society of Mechanical Engineers, Welded and Seamless Wrought Steel Pipe, ASME B36.10M-2004 (Oct. 25, 2004), 26 pages. (IPR Nos. '255 and '256 Exhibit 2138.
The Laser Institute of America, "American National Standard of Safe Use of Lasers" ANSI Z136.1-2000, Revision of ANSI Z136.1-1993, Second Printing 2003, 32 pages.
Thin Lens Equation, http://hyperphysics.phyastr.gsu.edu/hbase/geoopt/lenseq.html (last visited Dec. 30, 2018) (Brennan Deposition Exhibit 7), 4 pages. (IPR Nos. '255 and '256 Exhibit 2177).
Thomas, "A procedure for multiple-pulse maximum permissible exposure determination under the Z136.1-2000 American national standard for safe use of lasers," Journal of Laser Applications, Aug. 2001, vol. 13, No. 4, pp. 134-140.
Thrun, "Probabilistic Terrain Analysis for High-Speed Desert Driving" (Oct. 2005), 7 pages.
Trepagnier, "Team gray technical paper," DARPA grand challenge 2005 (Aug. 28, 2005), 14 pages.
Turk, et al., VITS—A Vision System for Autonomous Land Vehicle Navigation, 10 IEEE No. 3 (May 1988), pp. 342-361. (IPR Nos. '255 and '256 Exhibit 2147).
U.S. District Court, Claim Construction Order, *Quanergy Systems, Inc. v. Velodyne LiDAR, Inc.*, Case No. 5:16-cv-5251-EJD (Oct. 4, 2017), 33 pages. (IPR Nos. '255 and '256 Exhibit 1027).
U.S. International Trade Commission, Investigation No. 337-TA-1173, "Respondent Hesai Photonics Technology Co., Ltd.'s Notice of Prior Art," Nov. 13, 2019, 35 pages.
U.S. International Trade Commission, Investigation No. 337-TA-1173, "Respondent Robosense's Notice of Prior Art," Nov. 13, 2019, 34 pages.
U.S. Patent Office, Information Disclosure Statement, U.S. Appl. No. 10/391,383 (U.S. Pat. No. 7,130,672, Pewzner) (Aug. 3, 2005), 8 pages.
U.S. Patent Office, Information Disclosure Statement, U.S. Appl. No. 10/508,232 (U.S. Pat. No. 7,313,424, Mayevsky) (Apr. 21, 2006), 17 pages.
Ullrich, et al., "High-performance 3D-imaging laser sensor," Proceedings of SPIE vol. 3707 (Jun. 1999), pp. 658-664. (IPR Nos. '255 and '256 Exhibit 1014).
ULTRA Puck, VLP-32C Data Sheet (2018), 2 pages. (IPR Nos. '255 and '256 Exhibit 2093).
Urmson, "High speed navigation of unrehearsed terrain: red team technology for grand challenge 2004" (Jun. 1, 2004), 47 pages.
USGS, EROS CalVal Center of Excellence (ECCOE), https://calval.cr.usgs.gov/wordpress/wpcontent/uploads/JACIE_files/JACIE06/Files/312Habib.pdf (Dec. 21, 2018), 3 pages. (IPR Nos. '255 and '256 Exhibit 1071).
Uwinnipeg, Centripetal Acceleration, Uwinnipeg.ca, http://theory.uwinnipeg.ca/physics/circ/node6.html (1997), 2 pages. (IPR Nos. '255 and '256 Exhibit 2157).
Velodyne Acoustics, Inc., Motor Specification, Merlin Project, Rev. E1 Initial Engineering Release (Apr. 29, 2009), 1 page. (IPR Nos. '255 and '256 Exhibit 2020).
Velodyne Acoustics, Inc., Motor Winding Specs., P2.0 , E2 Changed Material (Mar. 10, 2010), 1 page. (IPR Nos. '255 and '256 Exhibit 2022).
Velodyne Acoustics, Inc., Outline Drawing HDL-64E S3 Envelope Drawing, Rev. A (Apr. 21, 2015), 1 page. (IPR Nos. '255 and '256 Exhibit 2094).
Velodyne LIDAR Products, PowerPoint (Jan. 18, 2017), 9 pages. (IPR Nos. '255 and '256 Exhibit 2031).
Velodyne LIDAR, CAD Drawing of MotorStat-38in, HDL-64E (2018), 1 page. (IPR Nos. '255 and '256 Exhibit 2063).
Velodyne LIDAR, CAD Drawing of MotorStat3in, HDL-64E (2018), 1 page. (IPR Nos. '255 and '256 Exhibit 2021).
Velodyne LIDAR, CAD Drawing of Rotor, HDL-64E (2018), 1 page. (IPR Nos. '255 and '256 Exhibit 2026).
Velodyne LIDAR, CAD Drawing of RotorAI, HDL-64E (2018), 1 page. (IPR Nos. '255 and '256 Exhibit 2027).
Velodyne LIDAR, Envelope Hi Res VLP-16 Drawings, Rev. A (Jun. 30, 2016), 4 pages. (IPR Nos. '255 and '256 Exhibit 2061).
Velodyne LIDAR, Excerpts of VLP-32C User Manual, 63-9325 Rev. B (2018), 26 pages. (IPR Nos. '255 and '256 Exhibit 2034).
Velodyne LIDAR, First Sensor Annual Report (2016), pp. 1-143. (IPR Nos. '255 and '256 Exhibit 2038).
Velodyne LIDAR, HDL-32E Data Sheet (2017), 2 pages. (IPR Nos. '255 and '256 Exhibit 2042).
Velodyne LIDAR, HDL-32E Envelope Drawing (2018), 1 page. (IPR Nos. '255 and '256 Exhibit 2043).
Velodyne LIDAR, HDL-32E Supported Sensors, Poly Synch Docs 2.3.2, http://docs.polysync.io/sensors/velodyne-hdl-32e/ (2018), 7 pages. (IPR Nos. '255 and '256 Exhibit 2055).
Velodyne LIDAR, HDL-32E User's Manual and Programing Guide (Aug. 2016), 29 pages. (IPR Nos. '255 and '256 Exhibit 2044).
Velodyne LIDAR, HDL-64E Data Sheet (2018), 2 pages. (IPR Nos. '255 and '256 Exhibit 2069).
Velodyne LIDAR, HDL-64E S2 and S2.1 User's Manual and Programming Guide (Nov. 2012), 43 pages. (IPR Nos. '255 and '256 Exhibit 2050).
Velodyne LIDAR, HDL-64E S2 Datasheet (Mar. 2010), 2 pages. (IPR Nos. '255 and '256 Exhibit 2047).
Velodyne LIDAR, HDL-64E S3 Data Sheet (2016), 2 pages. (IPR Nos. '255 and '256 Exhibit 2048).
Velodyne LIDAR, HDL-64E S3 User's Manual and Programming Guide (May 2013), 54 pages. (IPR Nos. '255 and '256 Exhibit 2051).
Velodyne LIDAR, HDL-64E User's Manual (Mar. 2008), 21 pages. (IPR Nos. '255 and '256 Exhibit 2052).
*Velodyne LIDAR, Inc. v. Hesai Photonics Technology Co., Ltd.* (N.D. Cal.), Complaint, Case No. 5:19-cv-04742 (Aug. 13, 2019), 13 pages.
*Velodyne LIDAR, Inc. v. Sunteng Innovation Technology Co., Ltd.* ("Robosense") (N.D. Cal.), Complaint, Case No. 5:19-cv-04746 (Aug. 13, 2019), 13 pages.
Velodyne LIDAR, Inc., Production Worksheet Detector, Item #24-AD5009 in Production, AD500-9 NIR Photodiode (Jan. 18, 2018), 1 page. (IPR Nos. '255 and '256 Exhibit 2024).
Velodyne LIDAR, Inc., Production Worksheet, Item #30-AD230CER2 in Production, APD, 230UM, Ceramic Submount (Jan. 17, 2018), 1 pages. (IPR Nos. '255 and '256 Exhibit 2023).

(56) References Cited

OTHER PUBLICATIONS

Velodyne LIDAR, It Began With a Race . . . 16 Years of Velodyne LiDAR, Velodyne LiDAR Blog, available at http://velodynelidar.com/blog/it-began-with-a-race/ (2018), 8 pages. (IPR Nos. '255 and '256 Exhibit 2070).
Velodyne LIDAR, Product Guide (2018), 1 page. (IPR Nos. '255 and '256 Exhibit 2058).
Velodyne LIDAR, Puck, Real-time 3D LiDAR Sensor, VLP-16 Data Sheet (2017), 2 pages. (IPR Nos. '255 and '256 Exhibit 2060).
Velodyne LIDAR, Ultra Puck™ VLP-32 Data Sheet (2014), 2 pages. (IPR Nos. '255 and '256 Exhibit 2032).
Velodyne LIDAR, Velodyne Donates LiDAR and Robotic Artifacts to Smithsonian, Point of Engineering, Point of Beginning (May 23, 2011), 2 pages. (IPR Nos. '255 and '256 Exhibit 2078).
Velodyne LIDAR, VLP-16 User's Manual and Programming Guide (Mar. 2016), 49 pages. (IPR Nos. '255 and '256 Exhibit 2062).
Velodyne LIDAR, VLP-32C User Manual, 63-9325 Rev. B. (Feb. 2, 2018), 136 pages. (IPR Nos. '255 and '256 Exhibit 2114).
Velodyne LIDAR, Webserver User Guide VLP-16 & HDL-32E (63-6266 Rev A) (Nov. 2015), 32 pages. (IPR Nos. '255 and '256 Exhibit 2013).
Velodyne LIDAR, White Paper, Velodyne's HDL-64E: A High Definition Lidar Sensor for 3-D Applications (Oct. 2007), 7 pages. (IPR Nos. '255 and '256 Exhibit 2059).
Velodyne, Velodyne—High Definition Lidar—Overview https://web.archive.org/web/20071107104255/ http://www.velodyne.com:80/lidar/products/overview.aspx (Nov. 7, 2007), 1 page. (IPR Nos. '255 and '256 Exhibit 1091).
Velodyne, Velodyne HDL Applications, https://web.archive.org/web/20080716041931/ http://www.velodyne.com:80/lidar/technology/applications.aspx (Jul. 16, 2008), 1 page. (IPR Nos. '255 and '256 Exhibit 1106).
Velodyne, Velodyne HDL-64E user manual, https://web.archive.org/web/20081117092628/ http://www.velodyne.com/lidar/products/manual/HDL-64E%20Manual.pdf (Nov. 17, 2008), 23 pages. (IPR Nos. '255 and '256 Exhibit 1090).
Velodynelidar, Data to Improve the Cost, Convenience and Safety of Motor Vehicles, https://velodynelidar.com/industry.html (2018), 6 pages. (IPR Nos. '255 and '256 Exhibit 1125).
Weber, Where to? A History of Autonomous Vehicles, Computer History Museum, https://support.garmin.com/en-US/?faq=IVeHYIKwChAYOqCVhQiJ67 (May 8, 2014), 23 pages. (IPR Nos. '255 and '256 Exhibit 2146).
Westinghouse, "AN/TPS-43 E Tactical Radar System" (1999), pp. 1-14.
Widmann, "Development of Collision Avoidance Systems at Delphi Automotive Systems" (1998), pp. 353-358.
Wikipedia, "Laser" (Nov. 10, 2017), 25 pages. (IPR Nos. '255 and '256 Exhibit 1022).
Willhoeft et al., "QUASI-3D Scanning with Laserscanners," IBEO Automobile Sensor, 8th World Congress on Intelligent Transport Systems—Quasi-3D Scanning (2001), IBEO Automobile Sensor, 8th World Congress on Intelligent Transport Systems—Quasi-3D Scanning (2001), 12 pages. (IPR Nos. '255 and '256 Exhibit 1077).
Williams, Bias Voltage and Current Sense Circuits for Avalanche Photodiodes—Feeding and Reading the APD, Linear Technology AN92-1 (Nov. 2012), 32 pages. (IPR Nos. '255 and '256 Exhibit 2125).
Williams, Driverless cars yield to reality: It's a long road ahead, PC World (Jul. 8, 2013), 6 pages. (IPR Nos. '255 and '256 Exhibit 2073).
Wulf et al., "Fast 3D Scanning Methods for Laser Measurement Systems, CSCS-14, 14th Int'l Conference on Control Systems and Computer Science" (Jul. 2003), pp. 312-317. (IPR Nos. '255 and '256 Exhibit 1078).
Wulf, "2D Mapping of Cluttered Indoor Environments by Means of 3D Perception," Proceedings of the 2004 IEEE International Conference on Robotics & Automation (Apr. 2004), pp. 4204-4209.
Yang, et al., "Performance of a large-area avalanche photodiode at low temperature for scintillation detection," Nuclear Instruments and Methods in Physics Research (2003), pp. 388-393 (IPR Nos. '255 and '256 Exhibit 1034).
Yu et al., A New 3D Map Reconstruction Based Mobile Robot Navigation, IEEE (2006), 4 pages. (IPR Nos. '255 and '256 Exhibit 2189).
Zappa, et al, SPADA: Single-Photon Avalanche Diode Arrays, IEEE Photonics Technology Letters, vol. 17, No. 3 (Mar. 2005), 9 pages. (IPR Nos. '255 and '256 Exhibit 1135).
Zhao, "A vehicle-borne urban 3-D acquisition system using single-row laser range scanners," IEEE transactions on systems, man, and cybernetics, vol. 33, No. 4 (Aug. 2003), pp. 658-666.
Zhao, "Reconstructing Textured CAD Model of Urban Environment Using Vehicle-Borne Laser Range Scanners and Line Cameras," Lecture Notes in Computer Science, vol. 2095 (2001), pp. 284-297.
Zheng, "The Technique of Land 3D Laser Scanning and Imaging Surveying," Railway Aerial Survey, vol. 2 (2003), 3 pages.
CN201780009097.4, "Office Action", dated Jul. 31, 2023, 9 pages.
EP17745112.7, "Notice of Decision to Grant", dated Aug. 31, 2023, 2 pages.

\* cited by examiner

| RETURN INDEX | TIME | DELTA TIME |
|---|---|---|
| 1 | T1 | |
| 2 | T2 | T2-T1 |
| 3 | T3 | T3-T2 |
| 4 | T4 | T4-T3 |
| 5 | T5 | T5-T4 |
| 6 | T6 | T6-T5 |

MULTIPLE PULSE, LIDAR BASED 3-D IMAGING

CROSS REFERENCE TO RELATED APPLICATION

The present application for patent claims the benefit of and priority to and is a continuation of U.S. application Ser. No. 16/854,755, filed Apr. 21, 2020, entitled "Multiple Pulse, LIDAR Based 3-D Imaging" which claims the benefit of and priority to and is a continuation of U.S. application Ser. No. 15/339,790, filed Oct. 31, 2016, entitled "Multiple Pulse, LIDAR Based 3-D Imaging" which claims priority under 35 U.S.C. § 119 from U.S. provisional patent application Ser. No. 62/289,277, entitled "Multiple Pulse, LIDAR Based 3-D Imaging", filed Jan. 31, 2016, the subject matter of each of which is incorporated herein by reference in its entirety.

TECHNICAL FIELD

The described embodiments relate to LIDAR based 3-D point cloud measuring systems.

BACKGROUND INFORMATION

A LIDAR system employs pulses of light to measure distance to an object based on the time of flight (TOF) of each pulse of light. A pulse of light emitted from a light source of the LIDAR system interacts with a distal object. A portion of the light reflects from the object and returns to a detector of the LIDAR system. Based on the time elapsed between emission of the pulse of light and detection of the returned pulse of light, a distance is estimated. In some examples, pulses of light are generated by a laser emitter. The light pulses are focused through a lens or lens assembly. The time it takes for a pulse of laser light to return to a detector mounted near the emitter is measured and a distance is derived from the time measurement with high accuracy.

Some LIDAR systems employ a single laser emitter/detector combination combined with a rotating mirror to effectively scan across a plane. Distance measurements performed by such a system are effectively two dimensional (i.e., planar), and the captured distance points are rendered as a 2-D (i.e., single plane) point cloud. In some examples, rotating mirrors are rotated at very fast speeds (e.g., thousands of revolutions per minute).

However, in many operational scenarios, a 3-D point cloud is required. A number of schemes have been employed to interrogate the surrounding environment in three dimensions. In some examples, a 2-D instrument is actuated up and down and/or back and forth, often on a gimbal. This is commonly known within the art as "winking" or "nodding" the sensor. Thus, a single beam LIDAR unit can be employed to capture an entire 3-D array of distance points, albeit one point at a time. In a related example, a prism is employed to "divide" the laser pulse into multiple layers, each having a slightly different vertical angle. This simulates the nodding effect described above, but without actuation of the sensor itself.

In all the above examples, the light path of a single laser emitter/detector combination is somehow altered to achieve a broader field of view. But, the number of pixels such devices can generate per unit time is inherently limited due to limitations on the pulse repetition rate of a single laser. Any alteration of the beam path to achieve a larger coverage area, whether it is by mirror, prism, or actuation of the device, comes at a cost of decreased point cloud density.

As noted above, 3-D point cloud systems exist in several configurations. However, in many applications it is necessary to collect distance measurements over a broad field of view. For example, in an autonomous vehicle application, the vertical field of view should extend down to the ground in front of the vehicle. In addition, the vertical field of view should extend above the horizon, in the event the car enters a dip in the road. In addition, it is necessary to have a minimum of delay between the actions happening in the real world and the imaging of those actions. In some examples, it is desirable to provide a complete image update at least five times per second. To address these requirements, a 3-D LIDAR system has been developed that includes an array of multiple laser emitters and detectors. This system is described in U.S. Pat. No. 7,969,558 issued on Jun. 28, 2011, the subject matter of which is incorporated herein by reference in its entirety.

In many applications, a sequence of pulses is emitted. The direction of each pulse is sequentially varied in rapid succession. In these examples, a distance measurement associated with each individual pulse can be considered a pixel, and a collection of pixels emitted and captured in rapid succession (i.e., "point cloud") can be rendered as an image or analyzed for other reasons (e.g., detecting obstacles). In some examples, viewing software is employed to render the resulting point clouds as images that appear three dimensional to a user. Different schemes can be used to depict the distance measurements as 3-D images that appear as if they were captured by a live action camera.

In some examples, the timing of successive light emission pulses is set such that the return signal associated with a particular pulse emission is detected before the subsequent pulse emission is triggered. This ensures that a detected return signal is properly associated with the particular pulse emission that generated the detected return signal.

In some other examples, multiple pulses are emitted into the surrounding environment before a return signal from any of the multiple pulses is detected. Traditionally, this approach raises the potential for cross-talk among detected signals. In other words, when multiple pulses are emitted into the surrounding environment before a return signal from any of the multiple pulses is detected, a detected return signal might be incorrectly associated with a different pulse emission than the particular pulse emission that gave rise to detected return signal. This can potentially cause errors in distance measurement.

Traditionally, to avoid cross-talk among the multiple pulses, each of the multiple pulses is projected in a different direction. By projecting each of the multiple pulses in a different direction, each volume of space interrogated by each of the multiple pulses is completely separated from any volume of space interrogated by any of the other multiple pulses. As the separation among simultaneously interrogated spaces is increased, the likelihood of inducing measurement error due to cross-talk is reduced.

Whether sequential pulse techniques, or multiple pulse techniques with spatial separation are employed, performance challenges remain.

The detection of return signals includes significant sources of measurement noise. In some examples, a light pulse due to sun light, a solar flare or cosmic ray is detected and mistakenly associated with a particular pulse emission. This results in a false distance measurement. In some other examples, a pulse emission from another LIDAR system is detected and mistakenly associated with a particular pulse emission. Again, this results in a false distance measurement. These problems are exacerbated as measurement ranges are extended for a LIDAR system without increasing laser pulse intensity.

Existing LIDAR systems employ a single light pulse to interrogate a particular volume of the surrounding environment at any given time. These systems are prone to signal contamination from external noise sources such as sun light, cosmic rays or other LIDAR based imaging systems.

Improvements in noise rejection are desired to extend measurement range and reject detected signals associated with illumination sources not associated with the LIDAR system.

SUMMARY

Methods and systems for performing multiple pulse LIDAR measurements are presented herein. In one aspect, each LIDAR measurement beam illuminates a location in a three dimensional environment with a sequence of multiple pulses of illumination light. Each measurement pulse sequence includes multiple pulses of illumination light and results in an estimate of distance between the 3-D LIDAR system and a particular location. Light reflected from the location is detected by a photosensitive detector of the LIDAR system during a measurement window having a duration that is longer than or equal to the time of flight of light from the LIDAR system out to the programmed range of the LIDAR system, and back.

In a further aspect, the LIDAR system determines the time of flight of the multi-pulse measurement beam from the LIDAR device to the particular illuminated spot of the three dimensional environment and back to the LIDAR device.

In some embodiments, a delay time between each LIDAR measurement is set to be greater than the time of flight of the measurement pulse sequence to and from an object located at the maximum range of the LIDAR device. In this manner, there is no cross-talk among different channels of the LIDAR system.

In some other embodiments, a measurement pulse sequence may be emitted from one multi-pulse illumination system before a measurement pulse sequence emitted from another multi-pulse illumination system has had time to return to the LIDAR device. In some embodiments, care is taken to ensure that there is sufficient spatial separation between the areas of the surrounding environment interrogated by each beam to avoid cross-talk. In some embodiments, the multi-pulse illumination associated with a particular measurement channel is encoded differently from any other multi-pulse illumination generated by any other measurement channel.

A multi-pulse illumination beam can be encoded according to a code diversity scheme, an amplitude diversity scheme, a time diversity scheme, or any combination thereof. By encoding the measurement pulse sequence and decoding the return measurement pulse sequence, reflected signals associated with illumination by a measurement pulse sequence are distinguished from exogenous signals.

In some examples, the coding of the multi-pulse illumination beam can be pseudorandom. In some examples, the coding of the multi-pulse beam can be changed in response to a measure of channel noise in the return signals. For example, if the return signal includes noise that exceeds a threshold value, another code is selected. In this manner, coding can be selected that minimizes the impact of exogenous noise sources, such as other LIDAR systems.

In general, the sequence of pulses in a measurement pulse sequence can vary in magnitude and duration. Furthermore, the delay between pulses and the number of pulses in each measurement pulse sequence can also be varied.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Figure 1:
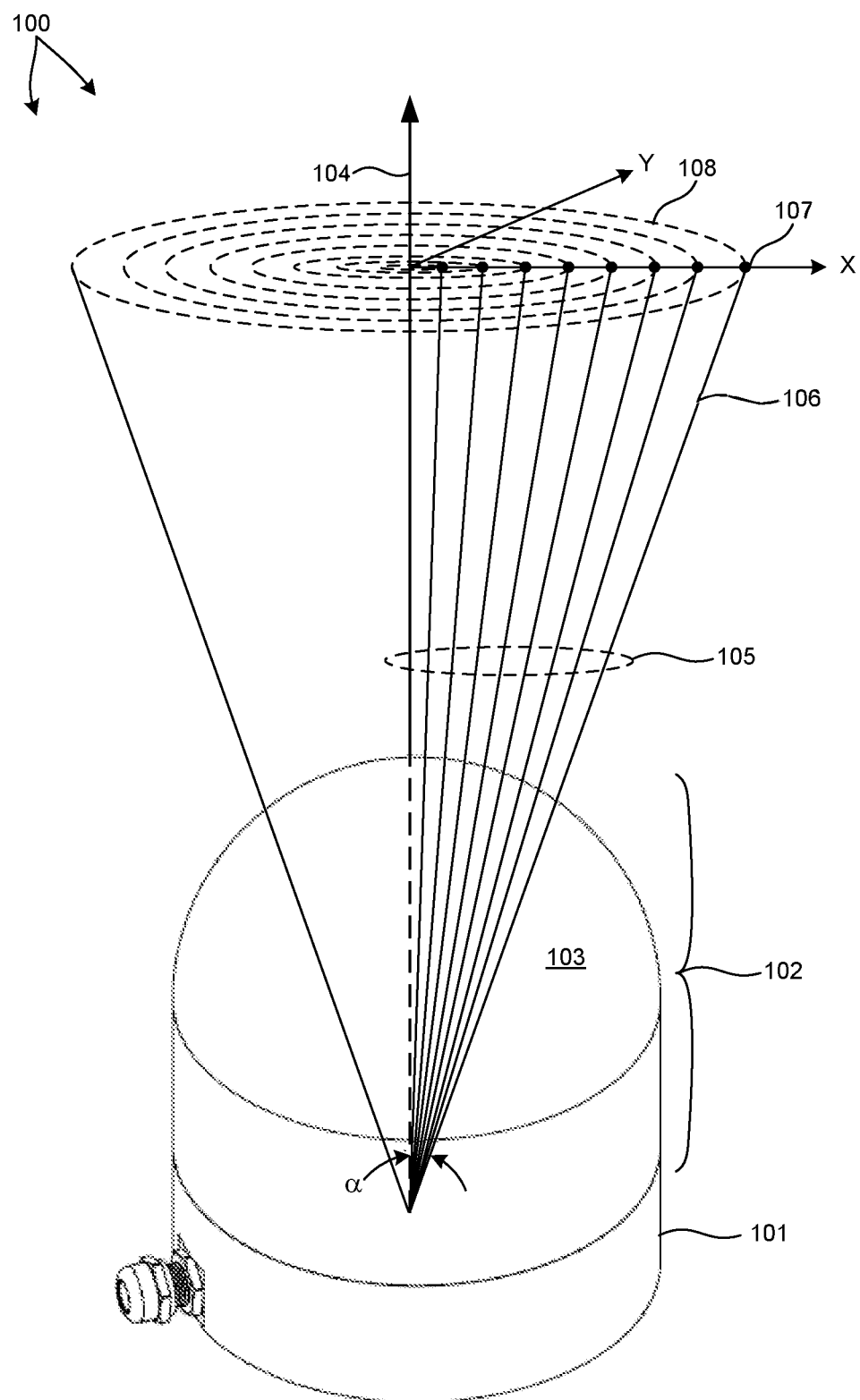
FIG. 1 is a simplified diagram illustrative of one embodiment of a 3-D LIDAR system 100 that may be employed to perform the multiple pulse measurement methods described herein.

FIG. 1 is a diagram illustrative of an embodiment of a 3-D LIDAR system 100 in one exemplary operational scenario. 3-D LIDAR system 100 includes a lower housing 101 and an upper housing 102 that includes a domed shell element 103 constructed from a material that is transparent to infrared light (e.g., light having a wavelength within the spectral range of 700 to 1,700 nanometers). In one example, domed shell element 103 is transparent to light having wavelengths centered at 905 nanometers.

As depicted in FIG. 1, a plurality of pulsed beams of light 105 are emitted from 3-D LIDAR system 100 through domed shell element 103 over an angular range, α, measured from a central axis 104. In the embodiment depicted in FIG. 1, the chief ray of each beam of light is illustrated. Each chief ray of each beam of light is projected onto a plane defined by the x and y axes at a plurality of different locations spaced apart from one another. For example, beam 106 is projected onto the xy plane at location 107.

In the embodiment depicted in FIG. 1, 3-D LIDAR system 100 is configured to scan each of the plurality of beams of light 105 about central axis 104. Each beam of light projected onto the xy plane traces a circular pattern centered about the intersection point of the central axis 104 and the xy plane. For example, over time, the projection of the chief ray of beam 106 onto the xy plane traces out a circular trajectory 108 centered about central axis 104. The xy plane is depicted in FIG. 1 to illustrate the spatial separation of beams emitted from 3-D LIDAR system 100. In general, the beams emitted from 3-D LIDAR system 100 are projected into the surrounding environment and are incident on objects in the path of each respective beam.

Figure 2:
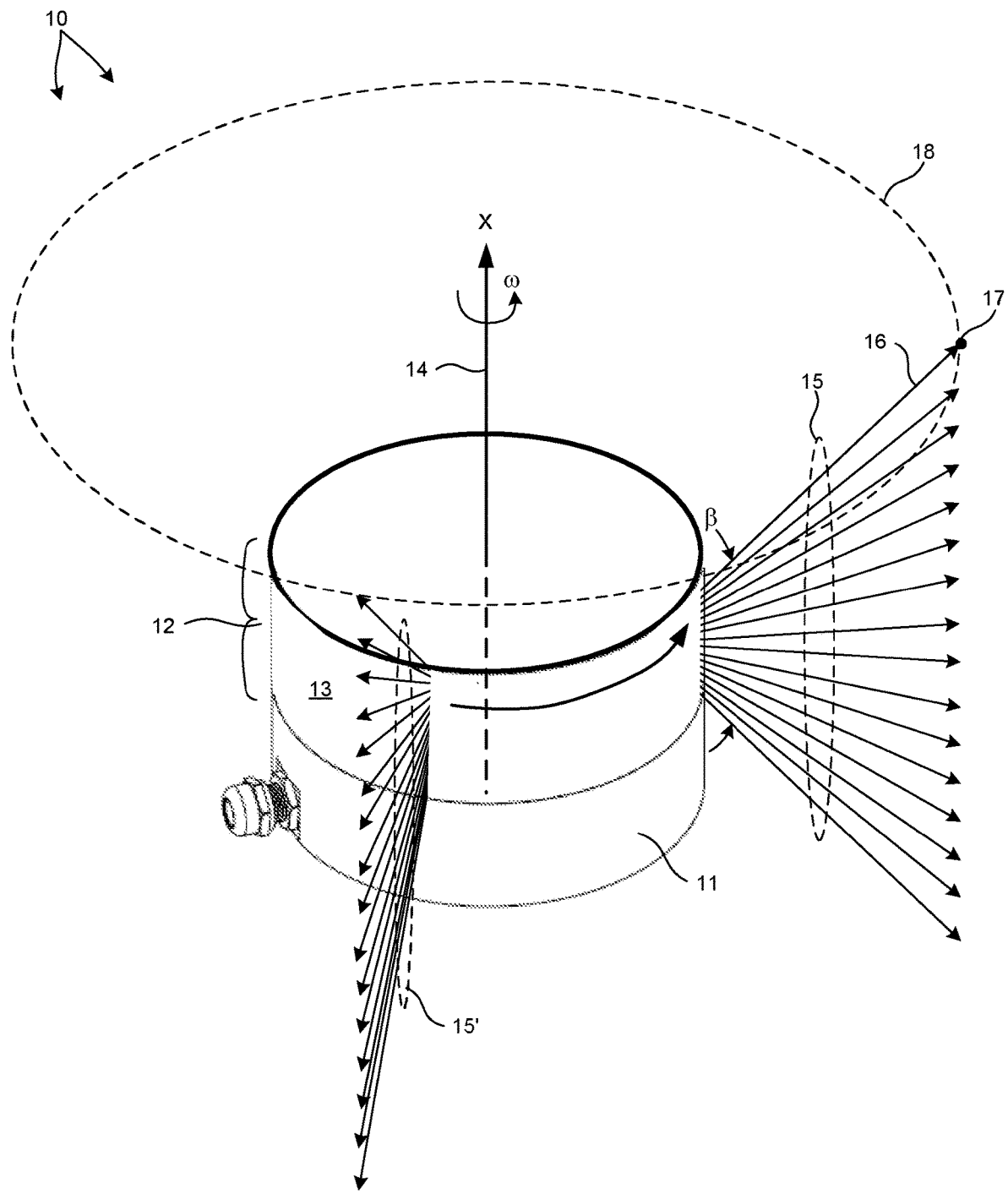
FIG. 2 is a simplified diagram illustrative of another embodiment of a 3-D LIDAR system 10 that may be employed to perform the multiple pulse measurement methods described herein.

FIG. 2 is a diagram illustrative of another embodiment of a 3-D LIDAR system 10 in one exemplary operational scenario. 3-D LIDAR system 10 includes a lower housing 11 and an upper housing 12 that includes a cylindrical shell element 13 constructed from a material that is transparent to infrared light (e.g., light having a wavelength within the spectral range of 700 to 1,700 nanometers). In one example, cylindrical shell element 13 is transparent to light having a wavelengths centered at 905 nanometers.

As depicted in FIG. 2, a plurality of beams of light 15 are emitted from 3-D LIDAR system 10 through cylindrical shell element 13 over an angular range, β. In the embodiment depicted in FIG. 2, the chief ray of each beam of light is illustrated. Each beam of light is projected outward into the surrounding environment in a different direction. For example, beam 16 is projected onto location 17 in the surrounding environment. In some embodiments, each beam of light emitted from system 10 diverges slightly. In one example, a beam of light emitted from system 10 illuminates a spot size of 20 centimeters in diameter at a distance of 100 meters from system 10. In this manner, each beam of illumination light is a cone of illumination light emitted from system 10.

In the embodiment depicted in FIG. 2, 3-D LIDAR system 10 is configured to scan each of the plurality of beams of light 15 about central axis 14 at angular velocity, ω. For purposes of illustration, beams of light 15 are illustrated in one angular orientation relative to a non-rotating coordinate frame of 3-D LIDAR system 10 and beams of light 15' are illustrated in another angular orientation relative to the non-rotating coordinate frame. As the beams of light 15 rotate about central axis 14, each beam of light projected into the surrounding environment (e.g., each cone of illumination light associated with each beam) illuminates a volume of the environment corresponding to the cone shaped illumination beam as it is swept around central axis 14.

Figure 3:
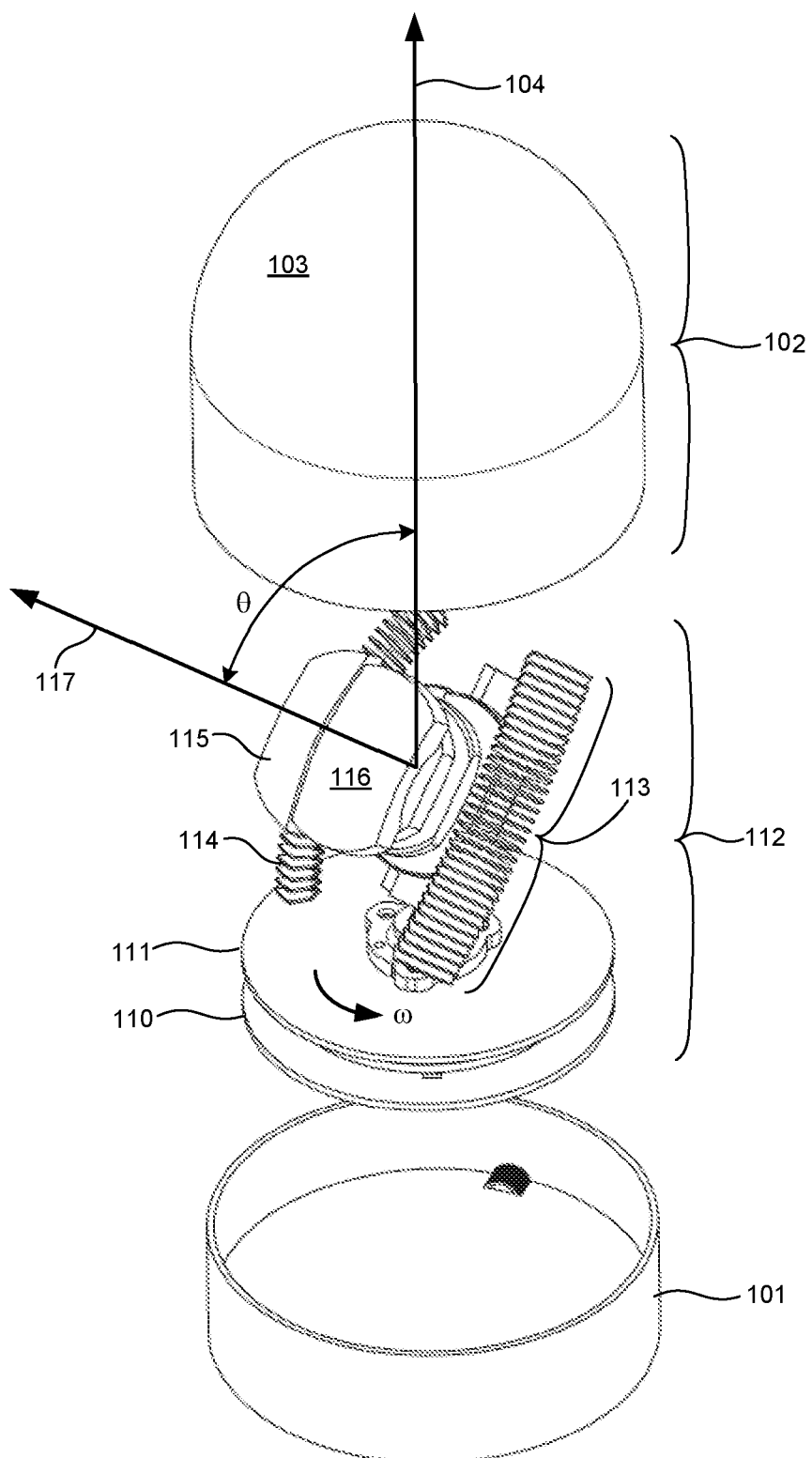
FIG. 3 depicts an exploded view of 3-D LIDAR system 100 in one exemplary embodiment.

FIG. 3 depicts an exploded view of 3-D LIDAR system 100 in one exemplary embodiment. 3-D LIDAR system 100 further includes a light emission/collection engine 112 that rotates about central axis 104. As depicted in FIG. 3, a central optical axis 117 of light emission/collection engine 112 is tilted at an angle, θ, with respect to central axis 104. 3-D LIDAR system 100 includes a stationary electronics board 110 mounted in a fixed position with respect to lower housing 101. Rotating electronics board 111 is disposed above stationary electronics board 110 and is configured to rotate with respect to stationary electronics board 110 at a predetermined rotational velocity (e.g., more than 200 revolutions per minute). Electrical power signals and electronic signals are communicated between stationary electronics board 110 and rotating electronics board 111 over one or more transformer elements, capacitive elements, or optical elements, resulting in a contactless transmission of these light signals. Light emission/collection engine 112 is fixedly positioned with respect to the rotating electronics board 111, and thus rotates about central axis 104 at the predetermined angular velocity, ω.

As depicted in FIG. 3, light emission/collection engine 112 includes an array of light emitting elements 114 and an array of light detecting. Light emitted from each of the light emitting elements 114 is directed toward a mirror (not shown). Light reflected from the mirror passes through a series of illumination optics 115 that collimate the emitted light into the array of beams of light 105 that are emitted from 3-D LIDAR system 100 as depicted in FIG. 1. In general, any number of light emitting elements can be arranged to simultaneously, or substantially simultaneously, emit any number of light beams from 3-D LIDAR system 100. In addition, any number of light emitting elements can be arranged to sequentially emit any number of light beams from 3-D LIDAR system 100. In one embodiment, two or more light emitting elements are triggered to emit light substantially simultaneously, and then after a programmed period of time has elapsed, another two or more light emitting elements are triggered to emit light substantially simultaneously. Light reflected from objects in the environment is collected by collection optics 116. Collected light associated with each illumination beam passes through collection optics 116 where it is focused onto each respective detecting element of the array of detecting elements 113. After passing through collection optics 116, the collected light is reflected from a mirror (not shown) onto each detector element. In practice, crosstalk among each measurement channel limits the number of channels that can be triggered simultaneously. However, to maximize imaging resolution, it is desirable to trigger as many channels as possible, simultaneously, so that time of flight measurements are obtained from many channels at the same time, rather than sequentially.

Figure 4:
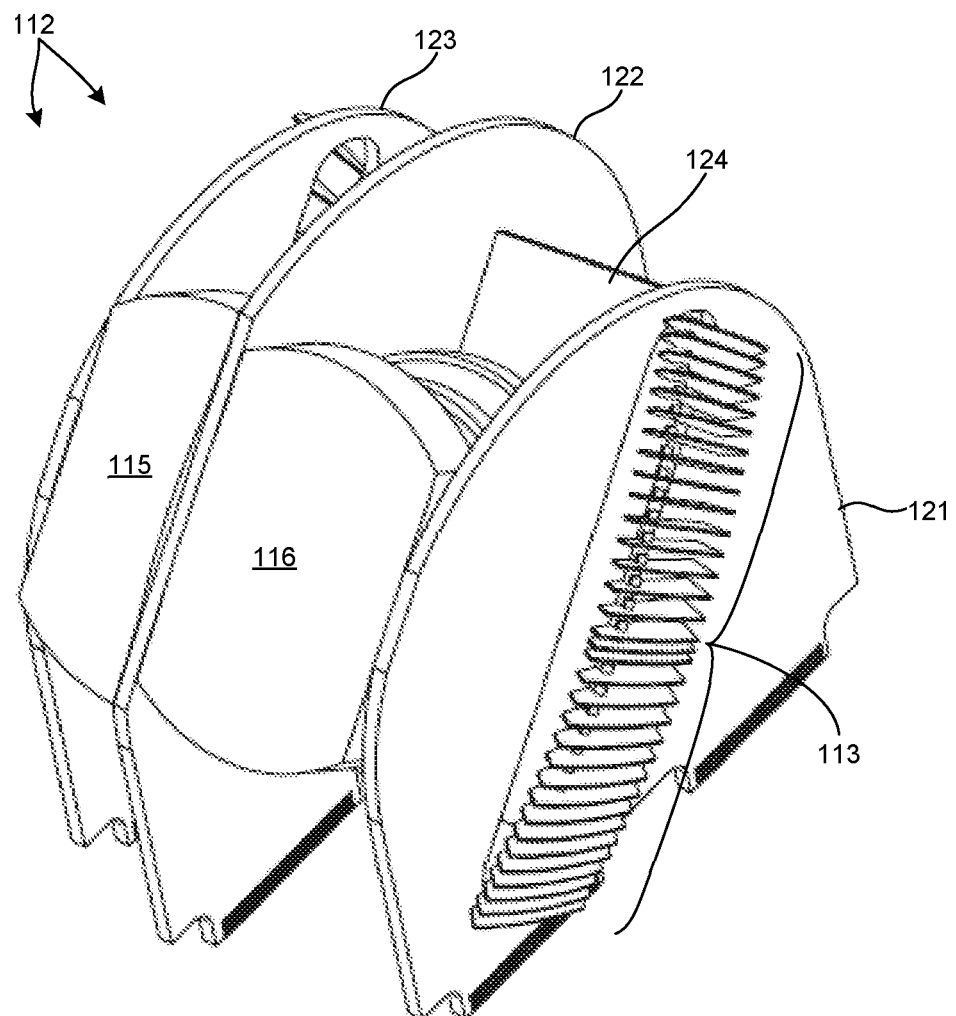
FIG. 4 depicts a view of light emission/collection engine 112 of 3-D LIDAR system 100.

FIG. 4 depicts another view of light emission/collection engine 112. In one aspect, light emission/collection engine 112 includes intermediate electronics boards 121, 122, and 123 which provide mechanical support and electrical connectivity between rotating electronics board 111 and various elements of light emission/collection engine 112. For example, each of the array of light detecting elements 113 is mounted to intermediate electronics board 121. Intermediate electronics board 121, in turn, is mechanically and electrically coupled to rotating electronics board 111. Similarly, each of the array of light emitting elements 114 is mounted to intermediate electronics board 123. Intermediate electronics board 123, in turn, is mechanically and electrically coupled to rotating electronics board 111. In another example, illumination optics 115 and collection optics 116 are mechanically mounted to intermediate electronics board 122. In this example, intermediate electronics board 122 spatially and optically separates the illumination optics 115 and the collection optics 116 to avoid contamination of the collected light with illumination light. Intermediate electronics board 122, in turn, is mechanically and electrically coupled to rotating electronics board 111. In this manner, the intermediate electronics boards provide mechanical and electrical connectivity and additional board area for mounting electrical components required for the operation of 3-D LIDAR system 100.

Figure 5:
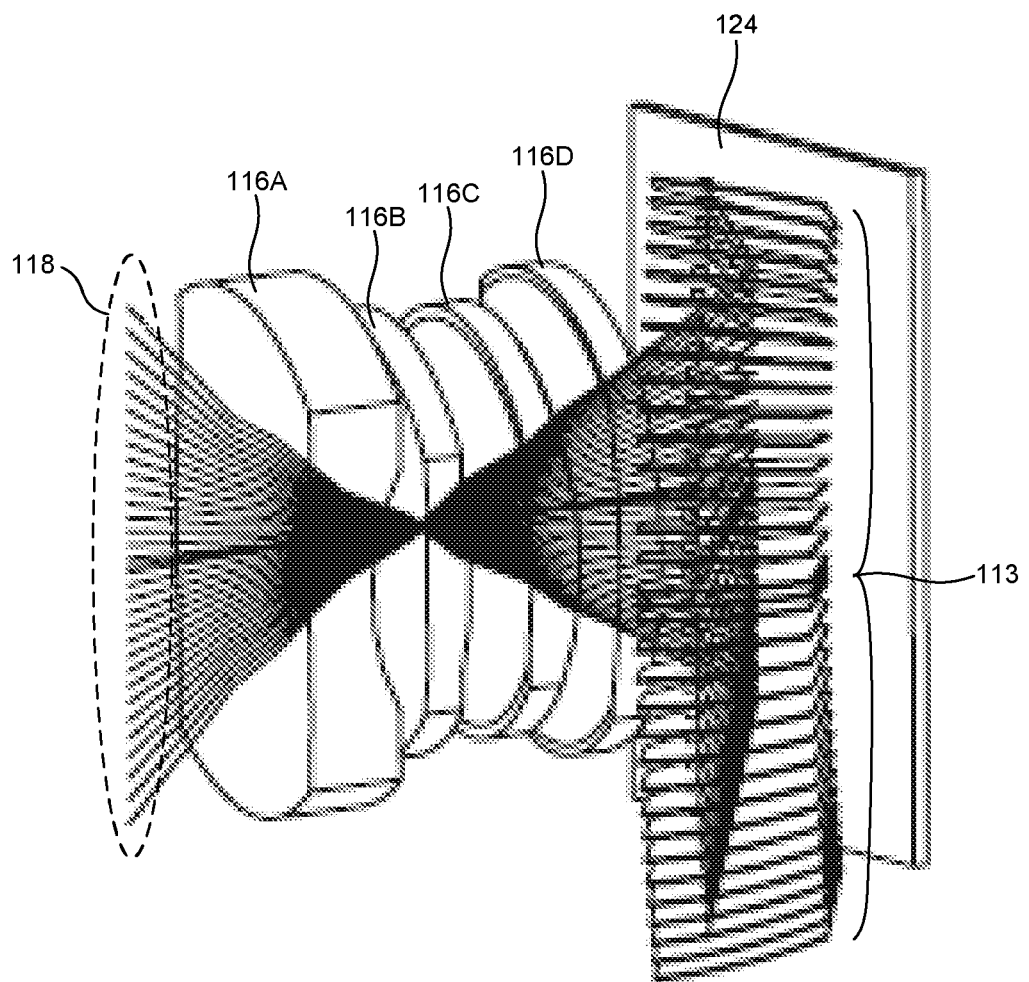
FIG. 5 depicts a view of collection optics 116 of 3-D LIDAR system 100 in greater detail.

FIG. 5 depicts a view of collection optics 116 in greater detail. As depicted in FIG. 5, collection optics 116 include four lens elements 116A-116D arranged to focus collected light 118 onto each of the array of detecting elements 113. Light passing through collection optics 116 is reflected from mirror 124 and is directed onto each of the array of detecting elements 113. In another aspect, one or more of the optical elements of collection optics 116 is constructed from one or more materials that absorb light outside of a predetermined wavelength range that includes the wavelengths of light emitted by each of the array of light emitting elements 114. In one example, one or more of the lens elements are constructed from a plastic material that includes a colorant additive to absorb light having wavelengths less than infrared light generated by each of the array of light emitting elements 114. In one example, the colorant is Epolight 7276A available from Aako BV (The Netherlands). In general, any number of different colorants can be added to any of the plastic lens elements of collection optics 116 to filter out undesired spectra.

Figure 6:
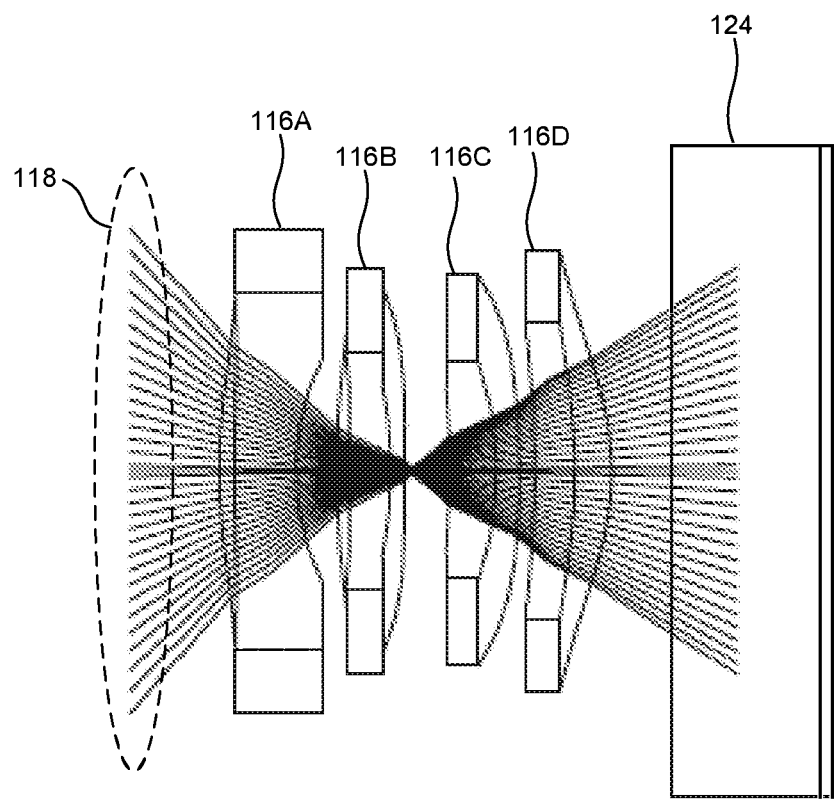
FIG. 6 depicts a cutaway view of collection optics 116 of 3-D LIDAR system 100 that illustrates the shaping of each beam of collected light 118.

FIG. 6 depicts a cutaway view of collection optics 116 to illustrate the bending of each beam of collected light 118.

As described hereinbefore, one or more of the optical elements of collection optics 116 is constructed from one or more materials that absorb light outside of a predetermined wavelength range that includes the wavelengths of light emitted by each of the array of light emitting elements 114. However, in general, one or more of the optical elements of illumination optics 115 may also be constructed from one or more materials that absorb light outside of a predetermined wavelength range that includes the wavelengths of light emitted by each of the array of light emitting elements 114.

A LIDAR system, such as 3-D LIDAR system 10 depicted in FIG. 2, and system 100, depicted in FIG. 1, includes a pulsed illumination source emitting a pulsed beam of illumination light from the LIDAR device into the surrounding environment. In some embodiments, the pulsed illumination source is laser based. In some embodiments, the pulsed illumination source is based on one or more light emitting diodes. In general, any suitable pulsed illumination source may be contemplated.

In one aspect, each measurement beam illuminates a particular location of the three dimensional environment (e.g., pixel) with a sequence of multiple pulses of illumination light. Hence, each measurement pulse sequence includes multiple pulses of illumination light that interrogates one location in the surrounding environment and results in an estimate of distance between the 3-D LIDAR system and the location. Light reflected from the location is detected by a photosensitive detector of the LIDAR system during a measurement window having a duration that is less than or equal to the time of flight of light from the LIDAR system out to the programmed range of the LIDAR system, and back. The photosensitive detector detects the measurement pulse sequence reflected from a particular location in the surrounding three dimensional environment. In this manner, the reflection from a particular measurement location of each pulse of the measurement pulse sequence is captured by the LIDAR system.

In a further aspect, the LIDAR system determines the time of flight of the multi-pulse measurement beam from the LIDAR device to the particular illuminated spot of the three dimensional environment and back to the LIDAR device. The time of flight is determined based on the reflected light detected during the measurement window. The distance between the LIDAR device and the particular location of the three dimensional environment illuminated by the multi-pulse beam of illumination light is determined based on the time of flight and the known speed of light.

Figure 7:
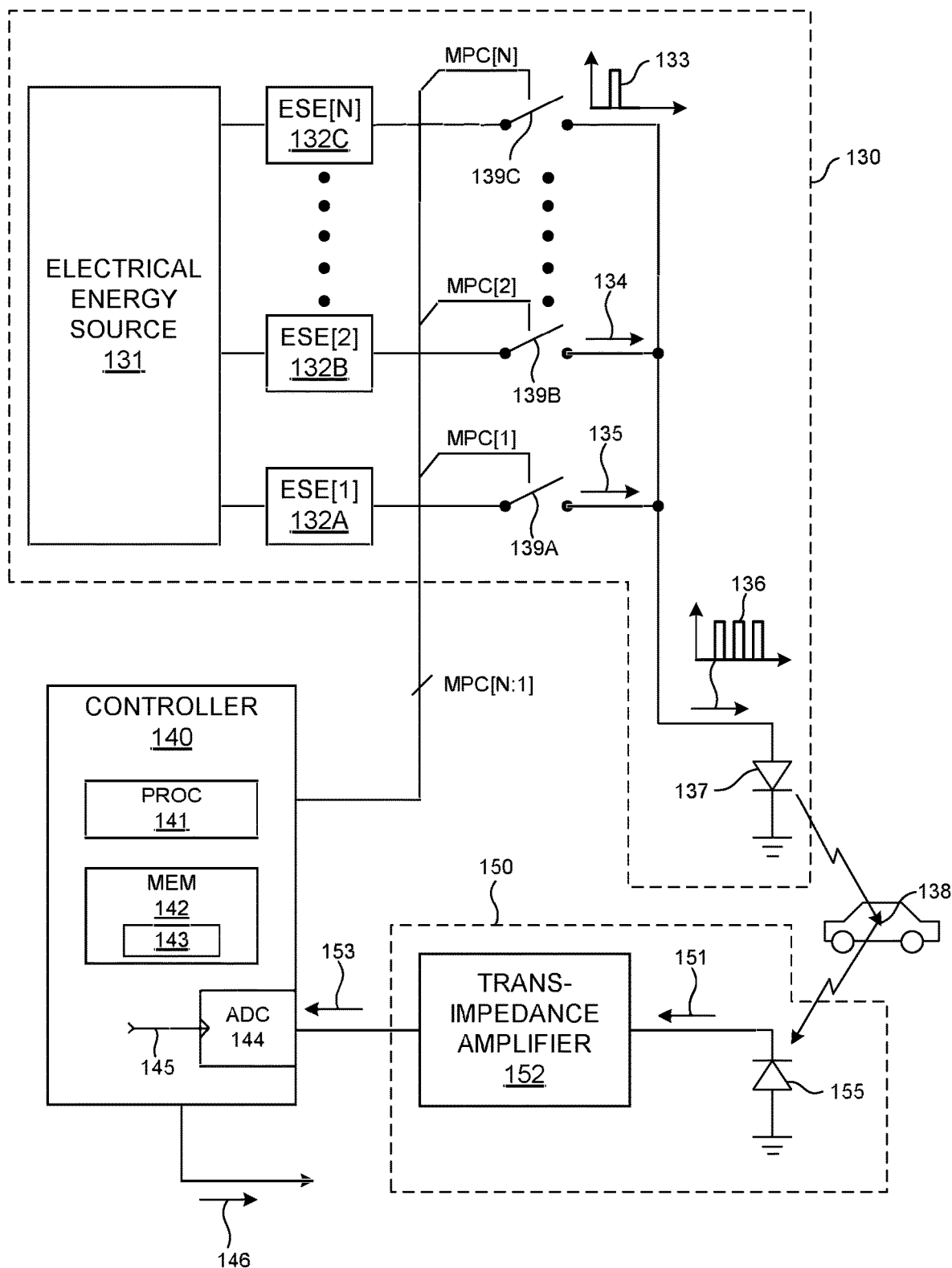
FIG. 7 depicts elements of a 3-D LIDAR system including a multi-pulse illumination system 130, a light detection system 150, and controller 140.

FIG. 7 depicts elements of a LIDAR system including a multi-pulse illumination system 130, a multiple pulse light detection system 150, and controller 140 in one embodiment. The embodiment depicted in FIG. 7 is provided by way of non-limiting example, and many other suitable embodiments for performing multiple pulse LIDAR measurements as described herein may be contemplated within the scope of this patent document.

Multi-pulse illumination system 130 includes a pulsed light emitting device 137. Pulsed light emitting device 137 generates pulsed light emission in response to a pulsed electrical signal 136 provided to the pulsed light emitting device. The light generated by pulsed light emitting device 137 is focused and projected onto a particular location 138 in the surrounding environment by one or more optical elements of the LIDAR system as a measurement pulse sequence. In one example, light emitted by pulsed light emitting device 137 is focused and projected onto a particular location by illumination optics 115 that collimate the emitted light into a multi-pulse beam of light 16 emitted from 3-D LIDAR system 10 as depicted in FIG. 2

Multi-pulse illumination system 130 includes any number of electrical energy storage elements (ESE) selectively coupled to the pulsed light emitting device 137. For illustration purposes, FIG. 7 depicts three energy storage elements (labeled ESE 132A-132C) of N energy storage elements, where N can be any integer number. In some examples, each energy storage element is a capacitor. An electrical energy source 131 (e.g., a voltage source) is electrically coupled to each of the energy storage element and provides electrical energy to each of electrical energy storage elements. Each of the electrical energy storage elements is selectively coupled to the pulsed light emitting device 137 by a switching element. Again, for illustration purposes, FIG. 7 depicts three switching elements (labeled 139A-139C) of N switching elements. Each switching element is configured to toggle between two states depending on the state of a control signal (e.g., digital control signal, MPC). In a first state, a switching element is substantially non-conductive. In this state, a corresponding energy storage element is effectively disconnected from the pulsed light emitting device 137. In this state, electrical energy flows from the electrical energy source 131 to each corresponding energy storage element to effectively charge the energy storage element. In a second state, the switching element is substantially conductive. In this state, the corresponding energy storage element is electrically coupled to the pulsed light emitting device 137. In this state, electrical energy flows from the energy storage element to the pulsed light emitting device 137.

As depicted in FIG. 7, any electrical current simultaneously supplied to the pulsed light emitting device 137 by any of the energy storage elements is effectively additive. In this manner, the electrical current signal 136 provided to the pulsed light emitting device 137 is effectively shaped by control signal, MPC. For example, when MPC[N] controls switching element 139C to toggle from a substantially non-conductive state to a substantially conductive state, a pulse of electrical current 133 is provided to pulsed light emitting device 137. Similarly, pulses of electrical current 134 and 135 can be provided to pulsed light emitting device 137 from energy storage elements ESE 132B and ESE 132A, respectively.

As depicted in FIG. 7, controller 140 generates control signal, MPC, which controls the timing of electrical current pulses provided to pulsed light emitting device 137, and thus, the timing of pulses of light emitted from the LIDAR device.

In general, each of the sequence of pulses commanded by controller 140 can vary in magnitude and duration. Furthermore, the delay between pulses and the number of pulses in each measurement pulse sequence can also be varied. In some examples, one pulse of the measurement pulse sequence has a larger amplitude than another pulse of the same measurement pulse sequence. In some examples, one pulse of the measurement pulse sequence has a longer duration than another pulse of the same measurement pulse sequence. In some examples, one pulse of the measurement pulse sequence has both a longer duration and greater amplitude than another pulse of the same measurement pulse sequence.

Figure 12:
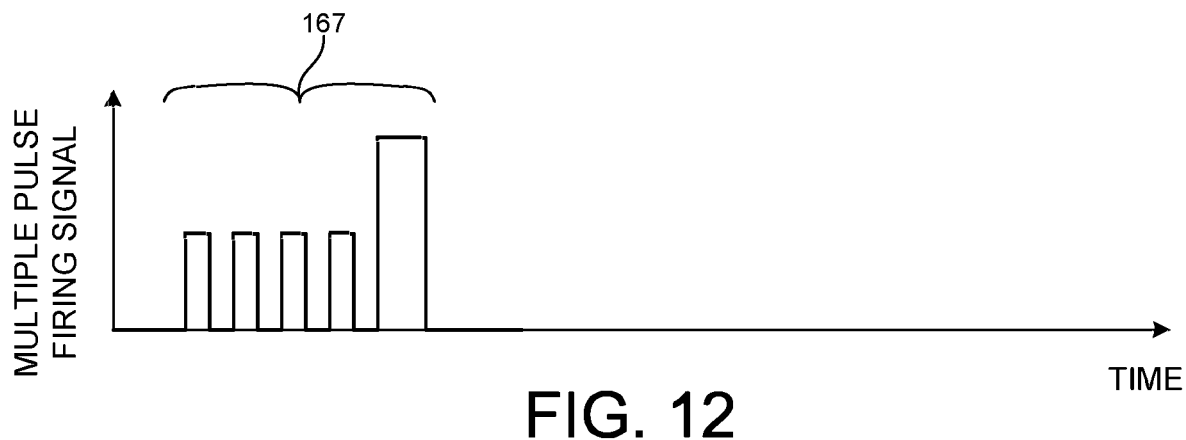
FIG. 12 depicts an illustration of a measurement pulse sequence 167 including four relatively small amplitude and short duration pulses followed by a fifth pulse having a relatively large amplitude and long duration.

In one embodiment, multi-pulse illumination system 130 includes eight electrical energy storage elements selectively coupled to a pulsed light emitting device in the manner described with reference to FIG. 7. In general, the eight available pulses of optical energy are combined and timed as desired. In one example depicted in FIG. 12, a measurement pulse sequence includes four relatively small amplitude and short duration pulses followed by a fifth pulse having a relatively large amplitude and long duration. Each of the first four pulses is generated by triggering the discharge of one energy storage element. The fifth pulse is generated by triggering the remaining four energy storage elements simultaneously into the pulsed light emitting device. In another embodiment, the fifth pulse may be generated by a single energy storage element that has a larger energy storage capacity. In this manner, the measurement light sequence includes four relatively small amplitude pulses followed by one large amplitude pulse. This may be desirable as the first four pulses are suitable for short distance measurements, and the large amplitude pulse is suitable for relatively long distance measurements. In general, the energy storage elements may be sized in any suitable manner and any number of energy storage elements may be triggered simultaneously to obtain a desired pulse amplitude within a multiple pulse illumination sequence.

In general, a multi-pulse illumination system 130 may include any number of electrical energy storage elements selectively coupled in series with a pulsed light emitting device. Furthermore, one or more of the electrical energy storage elements may have an energy storage capacity that differs from one or more of the other electrical energy storage elements.

Figure 13:
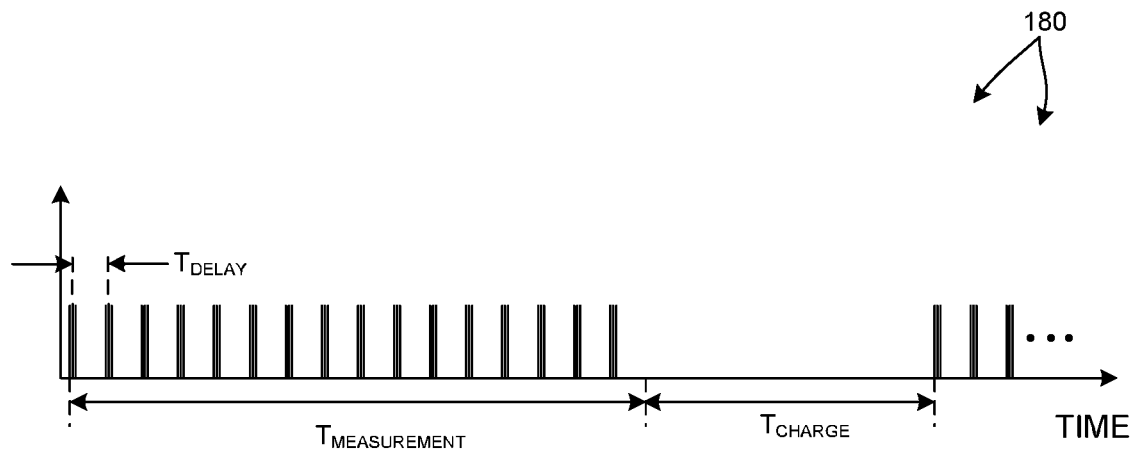
FIG. 13 depicts an illustration of the timing of light emission from sixteen multi-pulse illumination sub-systems.

In a further embodiment, a LIDAR system, such as LIDAR system 10 depicted in FIG. 2, includes sixteen multi-pulse illumination systems operating in coordination with a common controller (e.g., controller 140). FIG. 13 depicts an exemplary diagram 180 illustrating the timing of light emission from each of the sixteen multi-pulse illumination systems.

As depicted in FIG. 13, a measurement pulse sequence is emitted from a first multi-pulse illumination system. After a delay time, $T_{DELAY}$, a measurement pulse sequence is emitted from a second multi-pulse illumination system of the LIDAR device. In this manner a sequence of sixteen measurement pulse sequences are emitted in different directions from the LIDAR device during a measurement period, $T_{MEASUREMENT}$. The energy storage elements of each of the sixteen multi-pulse illumination systems are charged after the measurement period for a charging period, $T_{CHARGE}$. After, the charging period, another measurement pulse sequence is emitted from each multi-pulse illumination system over a subsequent measurement period.

In some embodiments, the delay time, $T_{DELAY}$, is set to be greater than the time of flight of the measurement pulse sequence to and from an object located at the maximum range of the LIDAR device. In this manner, there is no cross-talk among any of the sixteen multi-pulse illumination systems.

In some other embodiments, a measurement pulse sequence may be emitted from one multi-pulse illumination system before a measurement pulse sequence emitted from another multi-pulse illumination system has had time to return to the LIDAR device. In some of these embodiments, care is taken to ensure that there is sufficient spatial separation between the areas of the surrounding environment interrogated by each beam to avoid cross-talk. In some of these embodiments, the multi-pulse illumination generated by any multi-pulse illumination system employed by the LIDAR system is encoded differently from any other multi-pulse illumination generated by any other multi-pulse illumination system. In this manner, the return signal associated each multi-pulse illumination beam can be differentiated from any other collected light, even if there is spatial overlap among the beams.

As depicted in FIG. 7, light reflected from location 138 is detected by light detector 155. Light detector 155 generates an output signal 151 that is amplified by an analog trans-impedance amplifier 152. In general, the amplification of output signal 151 may include multiple, amplifier stages. In this sense, analog trans-impedance amplifier 152 is provided by way of non-limiting example, as many other analog signal amplification schemes may be contemplated within the scope of this patent document.

The amplified signal 153 is communicated to controller 140. An analog-to-digital converter (ADC) 144 of controller 140 is employed to convert the analog signal 153 into a digital signal used for further processing. Controller 140 generates an enable/disable signal 145 employed to control the timing of data acquisition by ADC 144 in concert with multi-pulse control signal, MPC.

Figure 8:
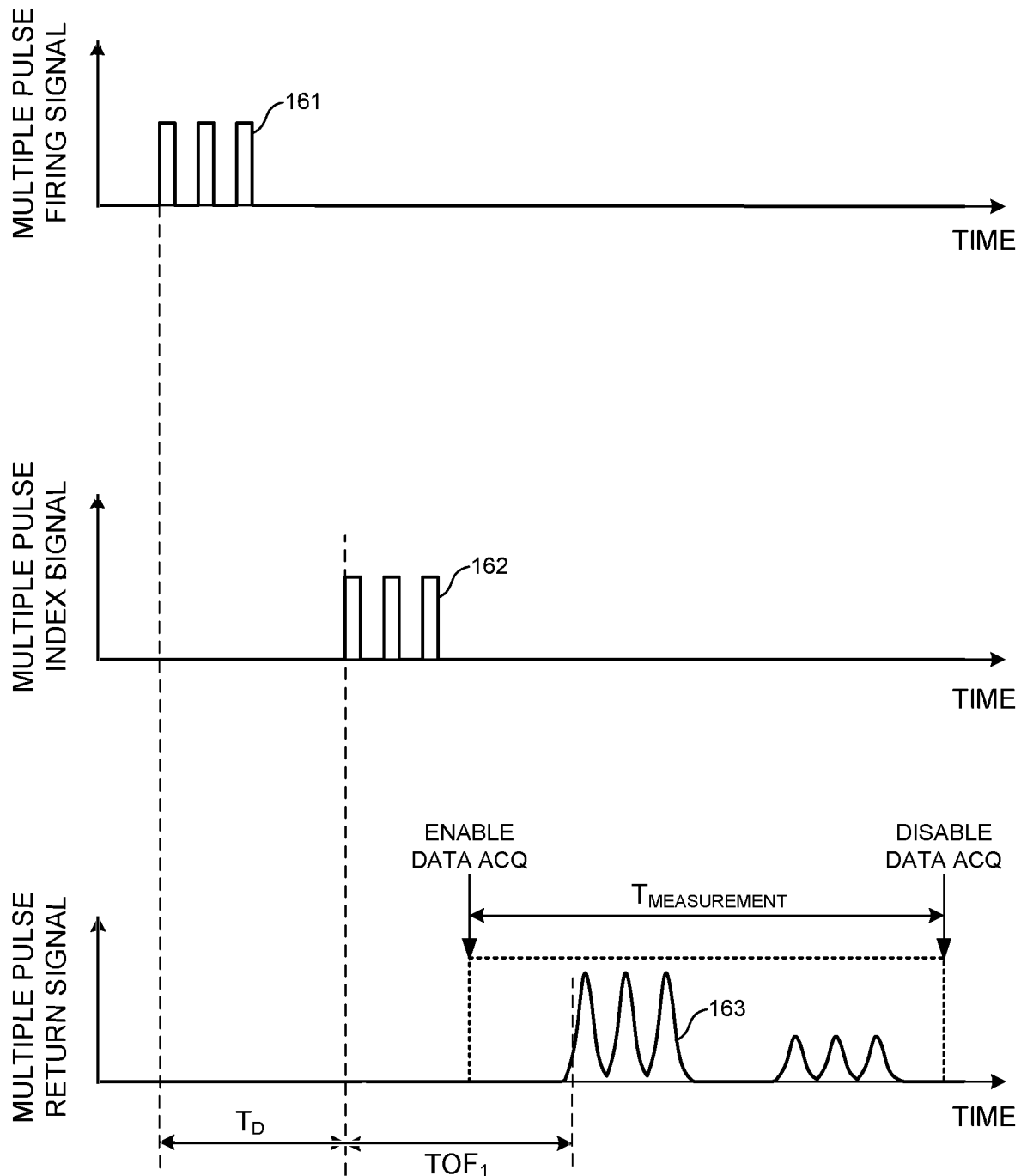
FIG. 8 depicts an illustration of the timing of emission of a multiple pulse measurement beam and capture of the returning measurement pulse sequence.

FIG. 8 depicts an illustration of the timing associated with the emission of a measurement pulse sequence and capture of the returning measurement pulse sequence. As depicted in FIG. 8, the measurement begins with a multiple pulse firing signal 161 (e.g., MPC[1]) generated by controller 140. Due to internal system delay, an index signal 162 is determined that is shifted from the multiple pulse firing signal 161 by a time delay, TD. The time delay includes the known delays associated with emitting light from the LIDAR system (e.g., signal communication delays and latency associated with the switching elements, energy storage elements, and pulsed light emitting device) and known delays associated with collecting light and generating signals indicative of the collected light (e.g., amplifier latency, analog-digital conversion delay, etc.). The index signal 162 may be a multiple pulse signal as depicted in FIG. 8, or a single pulse signal. The index signal is generated as a way to measure time delay within the system. As such, the index signal may be regenerated at any suitable time during system operation. In addition, an index signal may be employed to estimate time delay associated with one or more measurement channels.

As depicted in FIG. 8, a return signal 163 is detected by the LIDAR system in response to the illumination of a particular location. A measurement window (i.e., a period of time over which collected return signal data is associated with a particular measurement pulse sequence) is initiated by enabling data acquisition from light detecting element 150. Controller 140 controls the timing of the measurement window to correspond with the window of time when a return signal is expected in response to the emission of a measurement pulse sequence. In some examples, the measurement window is enabled at the point in time when the measurement pulse sequence is emitted and is disabled at a time corresponding to the time of flight of light over a distance that is twice the range of the LIDAR system. In this manner, the measurement window is open to collect return light from objects adjacent to the LIDAR system (i.e., negligible time of flight) to objects that are located at the maximum range of the LIDAR system. In this manner, all other light that cannot possibly contribute to useful return signal is rejected.

As depicted in FIG. 8, return signal 163 includes two return measurement pulse sequences that correspond with the emitted measurement pulse sequence. In general, signal detection is performed on all detected measurement pulse sequences. Further signal analysis may be performed to identify the closest signal (e.g., first instance of the return measurement pulse sequence), the strongest signal, and the furthest signal (e.g., last instance of the return measurement pulse sequence in the measurement window). Any of these instances may be reported as potentially valid distance measurements by the LIDAR system. For example, a time of flight, $TOF_1$, may be calculated from the closest (i.e., earliest) return measurement pulse sequence that corresponds with the emitted measurement pulse sequence as depicted in FIG. 8.

The emission and collection of measurement pulse sequences in the measurement of distance between a LIDAR system and a particular location in the surrounding environment enables the implementation of a number of schemes for noise rejection. This can result in an increase in achievable range and a reduction in sensitivity to unwanted signals (e.g., sun noise, solar flares, cross-talk from other LIDAR devices, etc.). The multi-pulse illumination beam can be encoded according to a code diversity scheme, an amplitude diversity scheme, a time diversity scheme, or any combination thereof. By encoding the measurement pulse sequence and decoding the return measurement pulse sequence, reflected signals associated with illumination by the measurement pulse sequence are distinguished from exogenous signals.

In some examples, the coding of the multi-pulse illumination beam can be pseudorandom. In some examples, the coding of the multi-pulse beam can be changed in response to a measure of channel noise in the return signals. For example, if the return signal includes noise that exceeds a threshold value, another code is selected. In this manner, coding can be selected that minimizes the impact of exogenous noise sources, such as other LIDAR systems.

Figure 9:
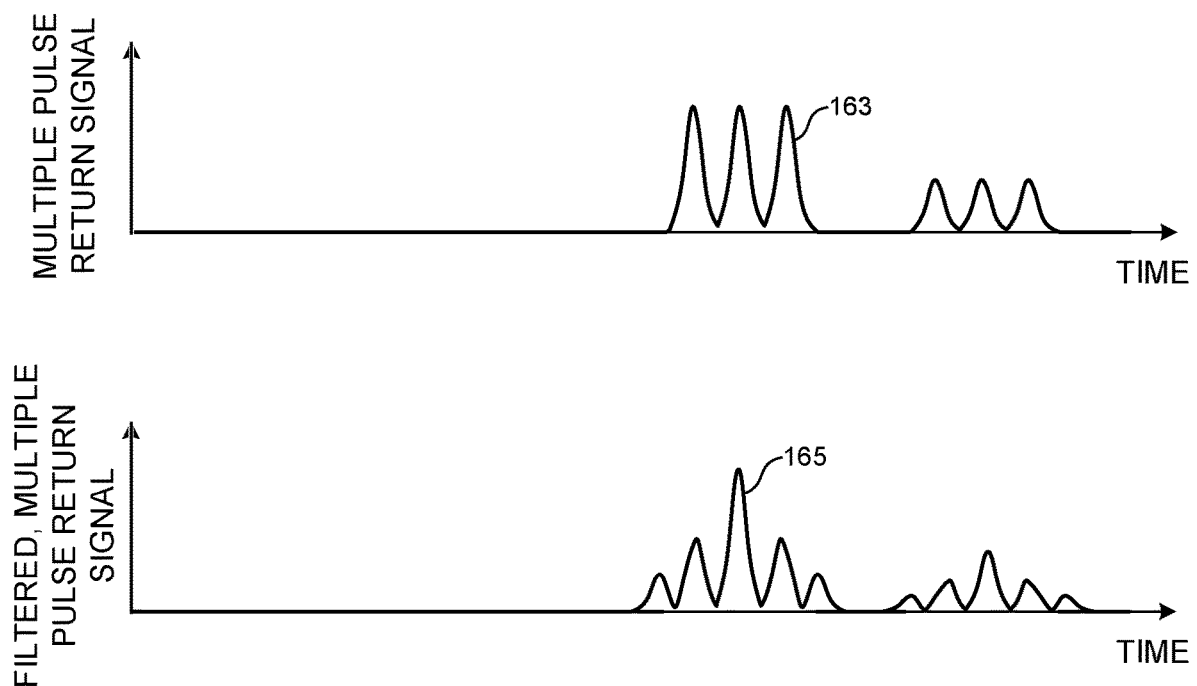
FIG. 9 depicts an illustration of a return measurement pulse sequence before and after filtering.

In one example depicted in FIG. 9, the return measurement pulse sequence 163 is filtered, for example, by a signature detection filter. In one example, the signature detection filter is an autocorrelation filter. The filtered signal 165 is also depicted in FIG. 9. In these examples, the collected signal is determined to be a legitimate return measurement pulse sequence if the filtered output signal exceeds a threshold value.

Figures 10, 11:
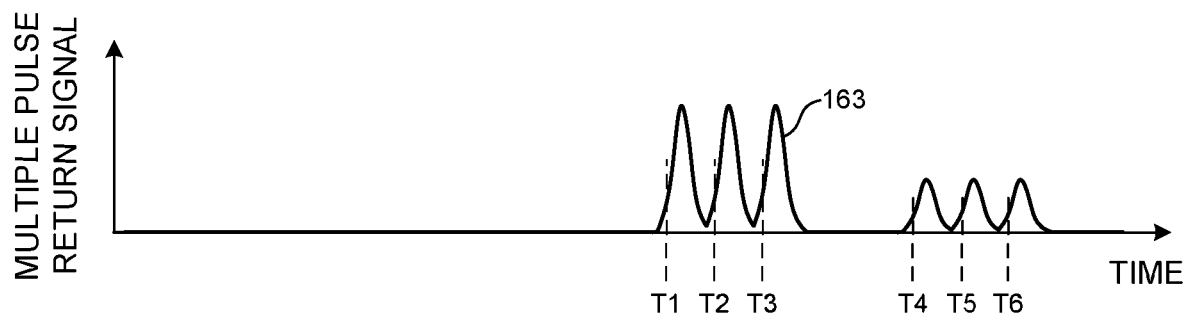
FIG. 10 depicts an illustration of a return measurement pulse sequence including time demarcations.
FIG. 11 depicts a table 170 indicating a time associated with each peak of the return measurement pulse sequence depicted in FIG. 10 and a time between adjacent peaks.

In another example depicted in FIGS. 10-11, the temporal spacing of peaks of the return measurement pulse sequence 163 are determined. For example, as depicted in FIG. 11, a table 170 indicates a time associated with each peak of the measurement pulse sequence 163 and a time between adjacent peaks. If a time between each of the successive instances is substantially similar to a time between the emitted measurement pulse sequence, the return measurement pulse sequence is determined to be legitimate. Thus, the time of flight of the multi-pulse beam of illumination light is based on a difference between a time when the multi-pulse beam is emitted from the LIDAR device and the time of detection associated with the plurality of successive instances of the output signal that exceed the threshold value.

In a further aspect, the emission and collection of multiple pulse sequences in the measurement of distance between a LIDAR system and a particular location in the surrounding environment enables the estimation of relative velocity between the LIDAR system and a detected object.

Figure 14:
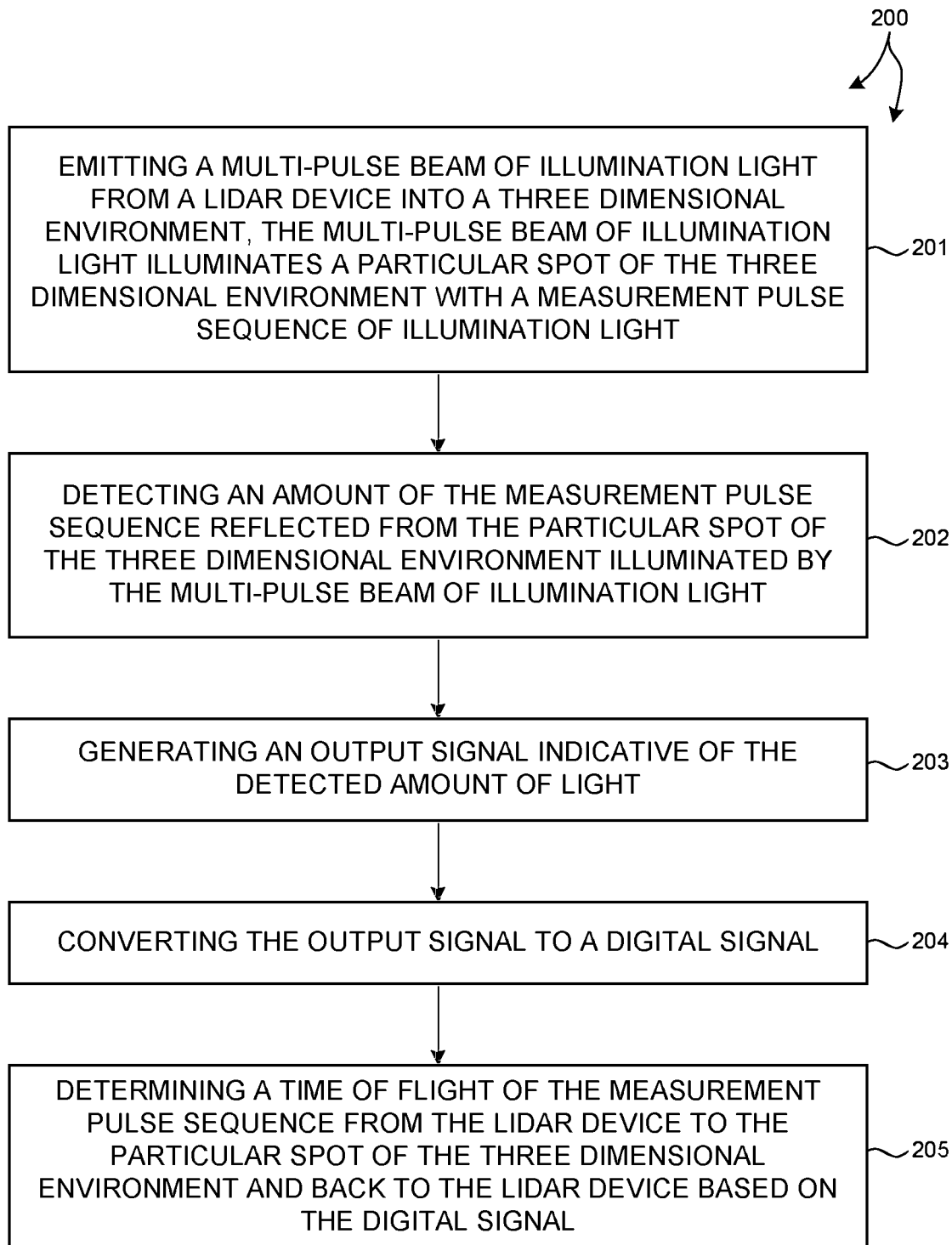
FIG. 14 depicts a flow chart illustrative of a method 200 of performing multiple pulse LIDAR measurements in at least one novel aspect.

FIG. 14 illustrates a method 200 of performing multiple pulse LIDAR measurements in at least one novel aspect. Method 200 is suitable for implementation by a LIDAR system such as LIDAR systems 100 and 10 illustrated in FIGS. 1 and 2, respectively, of the present invention. In one aspect, it is recognized that data processing blocks of method 200 may be carried out via a pre-programmed algorithm executed by one or more processors of controller 140, or any other general purpose computing system. It is recognized herein that the particular structural aspects of LIDAR systems 100 and 10 do not represent limitations and should be interpreted as illustrative only.

In block 201, a multi-pulse beam of illumination light is emitted from a LIDAR device into a three dimensional environment. The multi-pulse beam of illumination light illuminates a particular spot of the three dimensional environment with a measurement pulse sequence of illumination light.

In block 202, an amount of the measurement pulse sequence reflected from the particular spot of the three dimensional environment illuminated by the multi-pulse beam of illumination light is detected during a measurement time window. The measurement time window has a duration that exceeds the time of flight of light over a distance that is twice the measurement range of the LIDAR device.

In block 203, an output signal indicative of the detected amount of light is generated.

In block 204, the output signal is converted to a digital signal, for example, by analog to digital conversion electronics of controller 140 depicted in FIG. 7.

In block 205, a time of flight of the measurement pulse sequence from the LIDAR device to the particular spot of the three dimensional environment and back to the LIDAR device is determined based on the digital signal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above.

Accordingly, various modifications, adaptations, and combinations of various features of the described embodiments can be practiced without departing from the scope of the invention as set forth in the claims.

We claim:

1. A light detection and ranging (LiDAR) system, comprising:
   a light emitting device operable to emit a first light beam through illumination optics;
   collection optics configured to receive a reflected light beam and focus the reflected light beam on a mirror, the mirror configured to redirect the reflected light beam toward a light detecting device, the light detecting device configured to detect the reflected light beam and convert the reflected light beam into an electrical signal, the reflected light beam being a reflection of the first light beam and reflected by a reflection source;
   an intermediate structure configured to spatially and optically separate (i) the light emitting device, illumination optics, and beam path of the first light beam from the light emitting device to the illumination optics from (ii) the light detecting device, the collection optics, and beam path of the reflected light beam from the collection optics to the light detecting device; and
   one or more processing devices operable to perform operations including:
      determining, based on processing of the electrical signal, whether a particular temporal signal pattern is present in the reflected light beam, wherein determining whether the particular temporal signal pattern is present in the reflected light beam comprises determining a period of a periodic signal in a portion of the reflected light beam;
      determining a first attribute of the reflection source based on whether the particular temporal signal pattern is determined to be present in the reflected light beam;
      determining, based on the processing of the electrical signal, a time of flight of the first light beam and the reflected light beam between the LiDAR system and the reflection source; and
      determining, based on the time of flight of the first light beam and the reflected light beam, a second attribute of the reflection source, wherein the second attribute differs from the first attribute and comprises a distance between the LiDAR system and the reflection source.

2. The LiDAR system of claim 1, wherein determining the period of the periodic signal in the portion of the reflected light beam comprises:
   identifying a plurality of peaks in the electrical signal representing a respective plurality of peaks in the periodic signal in the portion of the reflected light beam; and
   determining periods between respective pairs of adjacent peaks in the plurality of peaks.

3. The LiDAR system of claim 1, wherein the processing of the electrical signal comprises analyzing a shape of a plurality of pulses in the electrical signal.

4. The LiDAR system of claim 3, wherein analyzing the shape of the plurality of pulses in the electrical signal comprises analyzing at least one attribute of the plurality of pulses in the electrical signal, the at least one attribute selected from a group consisting of duration, amplitude, and variation.

5. The LiDAR system of claim 1, wherein determining whether the particular temporal signal pattern is present in the reflected light beam comprises quantifying a degree of similarity between a sequence of pulses in the reflected light beam and a sequence of pulses in the particular temporal signal pattern.

6. The LiDAR system of claim 5, wherein quantifying the degree of similarity between the sequence of pulses in the reflected light beam and the sequence of pulses in the particular temporal signal pattern comprises applying a signature filter to (1) the electrical signal provided by the light detecting device and (2) a second electrical signal comprising the sequence of pulses in the particular temporal signal pattern.

7. The LiDAR system of claim 1, wherein the first light beam comprises a sequence of pulses.

8. The LiDAR system of claim 7, wherein the sequence of pulses in the first light beam is determined in accordance with a code diversity scheme, an amplitude diversity scheme, a time diversity scheme, or any combination thereof.

9. The LiDAR system of claim 1, wherein the operations further comprise controlling an operation of an autonomous vehicle based on processing of the electrical signal.

10. The LiDAR system of claim 1, wherein the light emitting device comprises one or more light emitting diodes.

11. The LiDAR system of claim 1, wherein the light emitting device and the light detecting device are disposed on a rotatable substrate, and wherein the one or more processing devices are disposed on a stationary substrate, the stationary substrate being stationary relative to the rotatable substrate.

12. The LiDAR system of claim 1, further comprising:
   a plurality of light emitting devices including the light emitting device, the plurality of light emitting devices operable to emit a respective plurality of light beams; and
   a plurality of light detecting devices including the light detecting device, the plurality of light detecting devices operable to detect a plurality of reflected light beams, the reflected light beams being respective reflections of the emitted light beams.

13. The LiDAR system of claim 1, wherein the operations further include determining, based on processing of the electrical signal, a relative velocity between the LiDAR system and a detected object.

14. A light detection and ranging (LiDAR) method, comprising:
   emitting, by a light emitting device of a LiDAR system, a first light beam through illumination optics;
   by collection optics, receiving a reflected light beam and focusing the reflected light beam on a mirror, wherein the mirror redirects the reflected light beam toward a light detecting device;
   by the light detecting device, detecting the reflected light beam and converting the reflected light beam into an electrical signal, the reflected light beam being a reflection of the first light beam and reflected by a reflection source, wherein an intermediate structure spatially and optically separates (i) the light emitting device, illumination optics, and beam path of the first light beam from the light emitting device to the illumination optics from (ii) the light detecting device, the collection optics, and beam path of the reflected light beam from the collection optics to the light detecting device; and
   by one or more processing devices, performing operations including:
      determining, based on processing of the electrical signal, whether a particular temporal signal pattern is present in the reflected light beam, wherein determining whether the particular temporal signal pattern is present in the reflected light beam comprises determining a period of a periodic signal in a portion of the reflected light beam;
      determining a first attribute of the reflection source based on whether the particular temporal signal pattern is determined to be present in the reflected light beam;
      determining, based on the processing of the electrical signal, a time of flight of the first light beam and the reflected light beam; and
      determining, based on the time of flight of the first light beam and reflected light beam, a second attribute of the reflection source, wherein the second attribute differs from the first attribute and comprises a distance between the LiDAR system and the reflection source.

15. The LiDAR method of claim 14, wherein determining the period of the periodic signal in the portion of the reflected light beam comprises:
   identifying a plurality of peaks in the electrical signal representing a respective plurality of peaks in the periodic signal in the portion of the reflected light beam; and
   determining periods between respective pairs of adjacent peaks in the plurality of peaks.

16. The LiDAR method of claim 14, wherein the processing of the electrical signal comprises analyzing a shape of a plurality of pulses in the electrical signal.

17. The LiDAR method of claim 16, wherein analyzing the shape of the plurality of pulses in the electrical signal comprises analyzing at least one attribute of the plurality of pulses in the electrical signal, the at least one attribute selected from a group consisting of duration, amplitude, and variation.

18. The LiDAR method of claim 14, wherein determining whether the particular temporal signal pattern is present in the reflected light beam comprises quantifying a degree of similarity between a sequence of pulses in the reflected light beam and a sequence of pulses in the particular temporal signal pattern.

19. The LiDAR method of claim 18, wherein quantifying the degree of similarity between the sequence of pulses in the reflected light beam and the sequence of pulses in the particular temporal signal pattern comprises applying a signature filter to (1) the electrical signal provided by the light detecting device and (2) a second electrical signal comprising the sequence of pulses in the particular temporal signal pattern.

20. The LiDAR method of claim 14, wherein the first light beam comprises a sequence of pulses.

21. The LiDAR method of claim 20, wherein the sequence of pulses in the first light beam is determined in accordance with a code diversity scheme, an amplitude diversity scheme, a time diversity scheme, or any combination thereof.

22. The LiDAR method of claim 14, wherein the operations further comprise controlling an operation of an autonomous vehicle based on processing of the electrical signal.

23. The LiDAR method of claim 14, wherein the light emitting device comprises one or more light emitting diodes.

24. The LiDAR method of claim 14, wherein the light emitting device and the light detecting device are disposed on a rotatable substrate, and wherein the one or more processing devices are disposed on a stationary substrate, the stationary substrate being stationary relative to the rotatable substrate.

* * * * *